United States Patent [19]

Ebiike et al.

[11] Patent Number: 5,770,707

[45] Date of Patent: Jun. 23, 1998

[54] MONOAZO COMPOUNDS AND DYEING OR PRINTING METHODS USING THE SAME

[75] Inventors: Yoshimi Ebiike, Izumi; Takeshi Washimi, Toyonaka; Yasuyoshi Ueda, Hirakata; Takashi Omura, Kobe, all of Japan

[73] Assignee: Sumitomo Chemical Company, Limited, Osaka, Japan

[21] Appl. No.: 605,432

[22] Filed: Feb. 22, 1996

[30] Foreign Application Priority Data

Feb. 22, 1995 [JP] Japan ........................................ 7-033481

[51] Int. Cl.[6] .................................................. C09B 62/51
[52] U.S. Cl. ........................................... 534/641; 534/640
[58] Field of Search ..................................... 534/642, 641

[56] References Cited

U.S. PATENT DOCUMENTS

| 5,250,670 | 10/1993 | Schlafer et al. ........................... 534/642 |
| 5,488,098 | 1/1996 | Miki et al. ............................. 534/642 X |

FOREIGN PATENT DOCUMENTS

| 0076782 | 4/1983 | European Pat. Off. . |
| 0218131 | 4/1987 | European Pat. Off. . |
| 0489692 | 6/1992 | European Pat. Off. . |
| 0501415 | 9/1992 | European Pat. Off. . |
| 0534342 | 3/1993 | European Pat. Off. . |
| 0535495 | 4/1993 | European Pat. Off. . |
| 58-065759 | 9/1981 | Japan . |
| 4-202368 | 7/1992 | Japan . |

OTHER PUBLICATIONS

Chemical Abstracts, vol. 118: 40817h, 1993, Monoazo compounds and dyeing and printing fibers therewith.

*Primary Examiner*—Fiona T. Powers

*Attorney, Agent, or Firm*—Stevens, Davis, Miller & Mosher, L.L.P.

[57] ABSTRACT

A monoazo compound represented by the general formula (I):

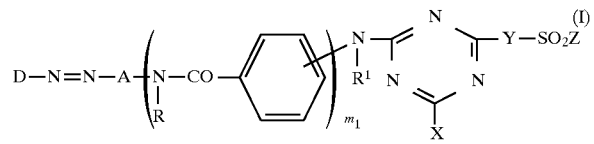

wherein

D is an optionally substituted phenyl or an optionally substituted naphthyl;

R and $R^1$ are hydrogen or an optionally substituted lower alkyl;

A is a naphthylene represented by the general formula (A1):

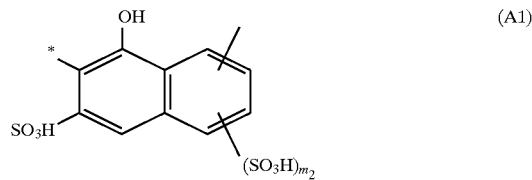

$m_1$ and $m_2$ are 0 or 1; Y is an aliphatic connecting group

Z is —CH=$CH_2$ or —$CH_2CH_2Z^1$ in which $Z^1$ is a group removable by the action of an alkali;

X is an aliphatic, aromatic, alicyclic, cyclic amino group, etc;

and a method for dyeing or printing fiber materials using the monoazo compound.

11 Claims, No Drawings

MONOAZO COMPOUNDS AND DYEING OR PRINTING METHODS USING THE SAME

The present invention relates to an improved novel monoazo compound which is suitable for dyeing and printing materials containing a hydroxyl group and/or amide group, particularly materials such as cellulose fiber, natural or synthetic polyamide fiber, polyurethane fiber, leather, and mixed fibers containing any materials of them and which is capable of giving dyed materials having good fastness to light and humidity. The present invention also relates to dyeing or printing methods using the monoazo compounds.

Heretofore, various reactive dyes have been known and they have widely been used in the field of dyeing and printing of fiber materials. For example, a monoazo compound having a vinylsulfon reactive group in the molecular structure and its use as the reactive dye are known.

However, the current technical level in the field of the reactive dye is not yet satisfactory in view of high-level requirements for dyeability and for fastness of the dyed product. That is, a known reactive dye is not necessarily sufficient in dyeing performances such as build-up properties, and fastness such as fastness to humidity of the dyed product. Further, such a known reactive dye cannot give sufficient dyeing performance and sufficient fastness simultaneously with maintaining good balance of them. Therefore, further improvement has been desired.

The present inventors have studied intensively for the purpose mentioned above. As a result, they found novel compounds which can widely satisfy essential elements to be required for the dye. Thus, the present invention has been accomplished.

The present invention provides a monoazo compound represented by the general formula (I):

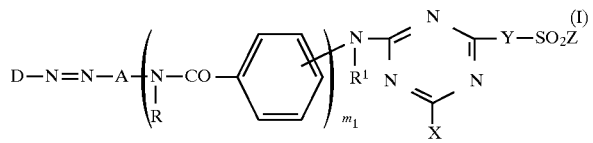

wherein

D is an optionally substituted phenyl or an optionally substituted naphthyl;

R and $R^1$, which are same or different, are hydrogen or an optionally substituted lower alkyl;

$m_1$ is 0 or 1;

A is a naphthylene represented by the general formula (A1):

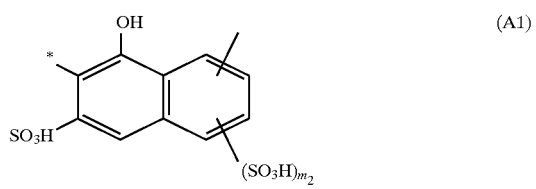

in which $m_2$ is 0 or 1, and * indicates the position bonding to azo group;

Y is an aliphatic connecting group represented by the general formula (Y1), (Y2) or (Y3):

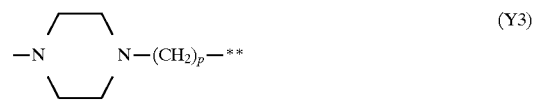

in which
$R^2$ and $R^3$, which are same or different, are hydrogen or an optionally substituted lower alkyl, $W^1$ is an optionally substituted alkylene having 1 to 5 carbon atoms, $W^2$ and $W^3$, which are same or different, are an alkylene having 2 to 6 carbon atoms, Q is —O— or —$NR^4$ in which $R^4$ is hydrogen or an alkyl having 1 to 4 carbon atoms, p is from 1 to 6, and ** indicates the position bonding to —$SO_2Z$;

Z is —CH=$CH_2$ or —$CH_2CH_2Z^1$ in which $Z^1$ is a group removable by the action of an alkali);

X is a group represented by the general formula (X1), (X2), (X3) or (X4):

wherein $R^6$ is hydrogen or an optionally substituted alkyl; $R^7$ and $R^9$, which are same or different, are hydrogen, an optionally substituted alkyl, an optionally substituted phenyl, an optionally substituted naphthyl or an optionally substituted cycloalkyl having 5 to 7 carbon atoms, provided that $R^6$ and $R^7$ have no fiber reactive group, $R^8$ is an optionally substituted alkyl, an optionally substituted phenyl, an optionally substituted naphthyl or an optionally substituted cycloalkyl having 5 to 7 carbon atoms, n is from 1 to 3, $Q^1$ is —O—, —S—, —$CH_2$—, —$SO_2$— or —$NR^{10}$— in which $R^{10}$ is hydrogen or an alkyl having 1 to 4 carbon atoms;

provided that when $m_1$ is 0; D—N=N—A—$NR^1$— is 5-hydroxy-7-sulfo-6-(1',5'-disulfo-2'-naphthylazo)-2-naphthylamino or 5-hydroxy-7-sulfo-6-(4'-methoxy-2',5'-disulfophenylazo)-2-naphthylamino, Y—$SO_2Z$ is 2-(2'-chloroethylsulfonyl) ethylamino or bis [2-(2'-chloroethylsulfonyl) ethyl]amino, and X is represented by the general formula (X1) wherein $R^7$ is an unsubstituted phenyl, the $R^6$ is an optionally substituted lower alkyl; and when either $m_1$, is 0; D—N=N—A—$NR^1$— is 5-hydroxy-7-sulfo-6-(2'-sulfophenylazo)-2-naphthylamino; Y—$SO_2Z$ is 2-(2'-chloroethylsulfonyl)ethylaminor bis [2-(2'chloroethylsulfonyl)ethyl]amino; and X is represented by the general formula (X2) wherein n is 2, or $m_1$ is 1, D—N=N—A—NR— is 8-hydroxy-3, 6-disulfo-7-(1',5'-disulfo-2'-naphthylazo)-1-naphthylamino, —$NR^1$— locates at the para-position to —CO—, Y—$SO_2Z$ is 2-(2'-chloroethylsulfonyl)ethylamino or bis[2-(2'-chloroethylsufonyl)ethyl]amino and X is represented by the general formula (X2) wherein n is 2, then $Q^1$ is not —O—; and salts thereof. (Hereinafter, monoazo compounds of formula (I) including salts thereof are represented as "compound I"). By fiber reactive group is meant a group which can attach with a fiber material, such as a cellulose fiber material or a polyamide fiber material, to form a covalent bond. Example of fiber reactive groups include groups of formula —$SO_2Z$ wherein Z is as defined above. In the specification, including the accompanying claims, the alkyl group or moieties may be straight- or branched-chain. The present invention also provides a method of dyeing or printing a fiber material which method comprises applying "compound I" to the fiber material.

In the general formula (I), D is a phenyl or a naphthyl, each of which may be unsubstituted or substituted.

Examples of the group which may be substituted on the phenyl or naphthyl represented by D include alkyl having 1 to 4 carbon atoms, alkoxy having 1 to 4 carbon atoms, carboxy, sulfo, halogeno and nitro. It is preferred that the phenyl or naphthyl represented by D has at least one sulfo group.

Examples of the phenyl represented by D include unsubstituted phenyl or phenyl substituted with one, two or three substituents selected from the group consisting of unsubstituted alkyl having 1 to 4 carbon atoms, alkoxy having 1 to 4 carbon atoms, carboxy, sulfo, halogeno and nitro. Among them, a group represented by the general formula (D1):

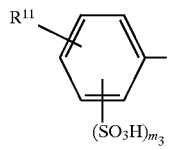 (D1)

wherein $R^{11}$ is hydrogen, carboxy, an alkyl having 1 to 4 carbon atoms or an alkoxy having 1 to 4 carbon atoms; and $m_3$ is 1 or 2 is preferred. A group represented by the general formula (D1) wherein $R^{11}$ is hydrogen, methyl, methoxy or carboxy is more preferred.

As the naphthyl represented by D, an unsubstituted naphthyl or a naphthyl substituted with one, two or three sulfo groups is preferred. Among them, a group represented by the general formula (D2):

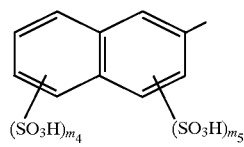 (D2)

wherein $m_4$ is 0 or 1; and $m_5$ is 1 or 2 is preferred. A group repesented by the general formula (D3):

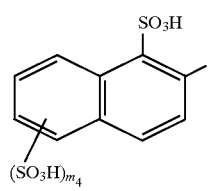 (D3)

wherein $m_4$ is as defined above is particularly preferred.

R and $R^1$ defined in the general formula (I) and $R^2$ and $R^3$ defined in the general formulae (Y1) and (Y2) are same or different. They are hydrogen or a lower alkyl which may be optionally substituted. Among the lower alkyl, the one having 1 to 4 carbon atoms is preferred. The lower alkyl group is typically substituted by one or two groups.

Examples of the group which may be substituted thereon include hydroxy, cyano, alkoxy, halogeno, carbamoyl, carboxy, alkoxycarbonyl, alkylcarbonyloxy, sulfo, sulfamoyl, vinylsulfonyl and —$SO_2CH_2CH_2Z^2$ in which $Z^2$ is a group removable by the action of an alkali. The alkoxy and alkyl moieties usually have 1 to 4 carbon atoms, preferably up to 2 carbon atoms. The substituent on the alkyl represented by R, $R^1$ and $R^3$ is usually selected from hydroxy, cyano, alkoxy, halogeno, carbamoyl, carboxy, alkoxycarbonyl, alkylcarbonyloxy, sulfo and sulfamoyl.

When R, $R^1$ $R^2$ and/or $R^3$ are an optionally substituted lower alkyl, examples of the preferred one include methyl, ethyl, n-propyl, isopropyl, n-butyl, isobutyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl and 4-sulfamoylbutyl.

In addition, the lower alkyl represented by $R^2$ can also be one represented by the following formula:

wherein $W^4$ is an optionally substituted alkylene having 1 to 5 carbon atoms; and $Z^2$ is as defined above.

R in the general formula (I) is preferably hydrogen. $R^1$ is preferably hydrogen, methyl or ethyl, and particularly preferably hydrogen.

In the general formula (I), A is an naphthylene represented by the general formula (A1). Among them, those represented by the formulas (A2), (A3) and (A4):

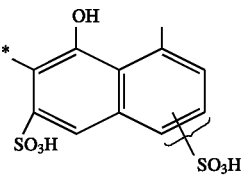 (A2)

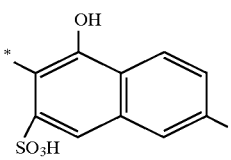 (A3)

-continued

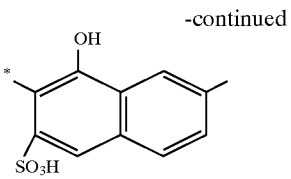
(A4)

wherein * is as defined above are preferred.

In the general formula (I), $m_1$ is 0 or 1 and preferably $m_1$ is 0. When $m_1$ is 1, —$NR^1$— can locates at the ortho-, meta- or par-position to —CO—, but normally locate at the meta- or para-position, preferably meta-position.

When Y is represented by the general formula (Y1), $w^1$ is an alkylene having 1 to 5 carbon atoms which may be optionally substituted. When the number of carbon atoms is not less than 2, the alkylene may be straight-chain or branched. Examples of the group which may be substituted on this alkylene include halogeno, hydroxy, sulfato, carboxy, cyano, alkylcarbonyloxy having 1 to 4 carbon atoms at the alkyl moiety, alkoxycarbonyl having 1 to 4 carbon atoms at the alkoxy moiety, carbamoyl, vinylsulfonyl and —$SO_2CH_2CH_2Z^3$ in which $Z^3$ is a group removable by the action of an alkali. Examples of the preferred alkylene represented by $W^1$ include methylene, ethylene, methylmethylene, trimethylene and tetramethylene. Among them, methylene or ethylene is particularly preferred.

$R^2$ in the general formula ($Y^1$) is preferably hydrogen, methyl, ethyl,

or

wherein $W^4$ and $Z^2$ are as defined above. Among them, hydrogen is particularly preferred. When $R^2$ is —$W^4$—$CH_2SO_2CH=CH_2$ or —$W^4$—$CH_2SO_2CH_2CH_2Z^2$, the alkylene represented by $W^4$ and its substituent can be the same as those described above as examples of the alkylene represented by $W^1$ and its substituent, respectively. In this case, $W^1$ and $W^4$ may be the same or different, but preferably at least one is unsubstituted. It is more preferred that both are unsubstituted.

When Y is represented by the general formula (Y2), $W^2$ and $W^3$, which are same or different, are an alkylene having 2 to 6 carbon atoms, and this alkylene may be straight-chain or branched. Preferred alkylene represented by $W^2$ and $W^3$ are ethylene, trimethylene or tetramethylene. Among them, ethylene is particularly preferred. $R^3$ in the general formula (Y2) is particularly preferably hydrogen. Q is —O— or —$NR^4$ wherein $R^4$ is as defined above. Preferred Q is —O— or —NH—. Among them, —O— is particularly preferred.

When Y is represented by the general formula (Y3), p is from 1 to 6, and particularly preferably 2,3 or 4.

In the general formula (I), Y is preferably represented by the general formula (Y1). Particularly the one represented by the following general formula:

wherein $m_6$ is 2 or 3, and ** is as defined above, is preferred.

In the general formula (I), when X is represented by the general formula (X1), $R^6$ is hydrogen or an alkyl and $R^7$ is hydrogen, an alkyl, a phenyl, a naphthyl or a cycloalkyl having 5 to 7 carbon atoms. The alkyl, phenyl, naphthyl and cycloalkyl may be unsubstituted or substituted, but have no fiber reactive group.

Alkyl represented by $R^6$ and $R^7$ is preferably a lower alkyl having 1 to 4 carbon atoms. Examples of the group which may be substituted on this alkyl include alkoxy having 1 to 4 carbon atoms, sulfo, carboxy, hydroxy, chloro, phenyl, cyano, sulfato, sulfamoyl, carbamoyl, acetylamino, dimethylamino and diethylamino. As the alkyl represented by $R^6$ and $R^7$, an unsubstituted alkyl or an alkyl substituted with one or two substituents selected from the group consisting of alkoxy having 1 to 4 carbon atoms, sulfo, carboxy, hydroxy, chloro, phenyl, cyano and sulfato is preferred. Examples of particularly preferred one include methyl, ethyl, n-propyl, isopropyl, n-butyl, sec-butyl, β-hydroxyethyl, β-sulfatoethyl, β-sulfoethyl, β-methoxyethyl, β-ethoxyethyl, β-chloroethyl and β-carboxyethyl.

When $R^6$ and/or $R^7$ is an alkyl substituted with a phenyl, such as benzyl, the phenyl may be further substituted. Examples of the group which may be substituted on this phenyl include alkyl having 1 to 4 carbon atoms, alkoxy having 1 to 4 carbon atoms, sulfo, chloro and bromo. As the alkyl substituted with phenyl, an unsubstituted benzyl or a benzyl substituted with one or two substituents selected from the above-mentioned groups is preferred. Among them, benzyl, 2-sulfobenzyl, 3-sulfobenzyl and 4-sulfobenzyl are more preferred.

When $R^7$ is phenyl, examples of the group which may be substituted thereon include alkyl having 1 to 4 carbon atoms, alkoxy having 1 to 4 carbon atoms, sulfo, carboxy, chloro, bromo, hydroxy, acetylamino and sulfomethyl. It is preferred that the phenyl represented by $R^7$ is unsubstituted or substituted with one or two substituents selected from the group consisting of alkyl having 1 to 4 carbon atoms, alkoxy having 1 to 4 carbon atoms, sulfo, carboxy, chloro and bromo. Preferred examples of $R^7$ include phenyl, 2-sulfophenyl, 3-sulfophenyl, 4-sulfophenyl, 3-carboxyphenyl, A-carboxyphenyl, 2-chlorophenyl, 3-chlorophenyl, 4-chlorophenyl, 2-methylphenyl, 3-methylphenyl, 4-methylphenyl, 2-methoxyphenyl, 3-methoxyphenyl, 4-methoxyphenyl, 2-carboxy-4-sulfophenyl, 2-carboxy-5-sulfophenyl, 2-sulfo-4-methylphenyl, 2-sulfo-5-methylphenyl, 2-sulfo-4-methoxyphenyl, 2-sulfo-5-methoxyphenyl, 2-methyl-4-sulfophenyl, 2-methyl-5-sulfophenyl, 2-methoxy-4-sulfophenyl and 2-methoxy-4-sulfophenyl. Particularly, unsubstituted phenyl or phenyl having sulfo or carboxy is preferred. In the latter case, it may have another substituent. $R^6$ is prefeablly hydrogen, methyl or ethyl when $R^7$ is an optionally substituted phenyl.

When $R^7$ is a naphthyl, examples of the group which may be substituted thereon include alkyl having 1 to 4 carbon atoms, alkoxy having 1 to 4 carbon atoms, hydroxy, sulfo, carboxy, chloro and bromo. The naphthyl represented by $R^7$ is preferably unsubstituted or substituted with one, two or three substituents selected from the above group. Particularly, those unsubstituted or those having sulfo or carboxy are preferred. Examples of particularly preferred one include 2-sulfo-1-naphthyl, 3-sulfo-1-naphthyl, 4-sulfo-1-naphthyl, 5-sulfo-1-naphthyl, 6-sulfo-1-naphthyl, 7-sulfo-1-naphthyl, 8-sulfo-1-naphthyl, 1-sulfo-2-naphtyl, 5-sulfo-2-naphtyl, 6-sulfo-2-naphtyl, 7-sulfo-2-naphtyl, 8-sulfo-2-naphtyl, 1,5-disulfo-2-naphthyl, 5,7-disulfo-2-naphthyl 6,8-disulfo-2-naphthyl, 4,8-disulfo-2-naphthyl, 4,7-disulfo-2-naphthyl, 3,8-disulfo-2-naphthyl, 4,6-disulfo-2-naphthyl, 3,7-disulfo-2-naphthyl, 3,6-disulfo-2-naphthyl, 4,6,8-trisulfo-1-naphthyl, 2,4,7-trisulfo-1-naphthyl, 3,6,8-trisulfo-1-naphthyl, 1,5,7-trisulfo-2-naphthyl, 4,6,8-trisulfo-2-naphthyl and 3,6,8-trisulfo-2-naphthyl.

When $R^7$ is a cycloalkyl, its number of carbon atoms is 5 to 7. Examples of the group which may be substituted thereon include an alkyl having 1 to 4 carbon atoms.

In the present invention, $R^6$ is an optionally substituted lower alkyl when $m_1$ is 0, D—N=N—A—$NR^1$— is 5-hydroxy-7-sulfo-6-(1',5'-disulfo-2'-naphthylazo)-2-naphthylamino or 5-hydroxy-7-sulfo-6-(4'-methoxy-2',5'-disulfophenylazo)-2-naphthylamino, Y—SO$_2$ is 2-(2'-chloroethylsulfonyl)ethylamino represented by the formula:

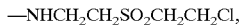
—NHCH$_2$CH$_2$SO$_2$CH$_2$CH$_2$Cl, or bis[2-(2'-chloroethylsulfonyl)ethyl]amino represented by the formula:

—N(CH$_2$CH$_2$SO$_2$CH$_2$CH$_2$Cl)$_2$, and X is represented by the general formula (X1) wherein R$^7$ is unsubstituted. In this case, particularly methyl or ethyl is preferred as R$^6$.

In the above definition, the case that m1 is 0 and D—N=N—A—NR$^1$— is 5-hydroxy-7-sulfo-6-(1',5'-disulfo-2'-naphthylazo)-2-naphthylamino or 5-hydroxy-7-sulfo-6-(4'-methoxy-2',5'-disulfophenylazo)-2-naphthylamino means that D is 1,5-disulfo-2-naphthyl represented by the formula (D4):

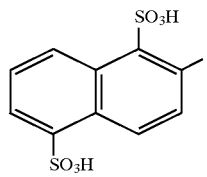

or 4-methoxy-2,5-disulfophenyl represented by the formula (D5):

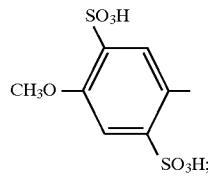

A is 5-hydroxy-7-sulfo-2,6-naphthalene represented by the above formula (A3) and A bonds to an azo group at the 6-position), and R$^1$ is hydrogen.

In the general formula (I), when X is represented by the general formula (X2), n is an integer of 1 to 3, and Q$^1$ is —O—, —S—, —CH$_2$—, —SO$_2$— or —NR$^{10}$— wherein R$^{10}$ is as defined above. It is particularly preferred that n is 2 and Q$^1$ is —CH$_2$— or —O—.

Q$^1$ is —S—, —CH$_2$—, —SO$_2$— or —NR$^{10}$ wherein R$^{10}$ is as defined above when m1 is 0, D—N=N—A—NR$^1$— is 5-hydroxy-7-sulfo-6-(2'-sulfonylazo)-2-naphthylamino, Y—SO$_2$Z is a group represented by the formula:

—NHCH$_2$CH$_2$SO$_2$CH$_2$CH$_2$Cl, or

—N(CH$_2$CH$_2$SO$_2$CH$_2$CH$_2$Cl)$_2$ and X is represented by the general formula(X2) wherein n is 2; or when m1 is 1, D—N=N—A—NR$^1$— is 8-hydroxy-3,6-disulfo-7-(1',5'-disulfo-2'-naphthylazo)-1-naphthylamino, —NR$^1$ locates at the para-position of —CO—, Y—SO$_2$Z is a group represented by the formula:

—NHCH$_2$CH$_2$SO$_2$CH$_2$CH$_2$Cl, or

—N(CH$_2$CH$_2$SO$_2$CH$_2$CH$_2$Cl)$_2$ and X is represented by the general formula (X2) wherein n is 2. In the above-mentioned case, as Q$^1$, —CH$_2$ or —SO$_2$ is particularly preferred.

In the above definition, the case that m1 is 0 and D—N=N—A—NR$^1$— is 5-hydroxy-7-sulfo-6-(2'-sulfonylazo)-2-naphthylamino means that D is 2-sulfophenyl represented by the formula (D6):

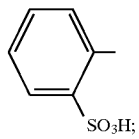

A is 5-hydroxy-7-sulfo-2,6-naphthalene represented by the above formula (A3) and A bonds to an azo group at the 6-position, and R$^1$ is hydrogen.

In addition, the case that m$_1$ is 1 and D—N=N—A—NR— is 8-hydroxy-3,6-disulfo-7-(1',5'-disulfo-2'-naphthylazo)-1-naphthylamino means that D is 1,5-disulfo-2-naphthyl represented by the above formula(D4); A is 8-hydroxy-3,6-disulfo-1,7-naphthalene represented by the formula (A5):

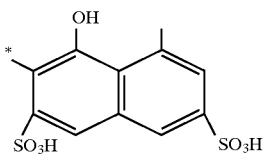

wherein * is as defined above and A bonds to an azo group at the 7-position, and R$^1$ is hydrogen.

In the general formula (I), when X is represented by the general formula (X3) or (X4), R is an alkyl, a phenyl, a naphthyl or a cycloalkyl having 5 to 7 carbon atoms, and R$^9$ is hydrogen, an alkyl, a phenyl, a naphthyl or a cycloalkyl having 5 to 7 carbon atoms. When R$^8$ and/or R$^9$ is an alkyl, a phenyl, a naphthyl or a cycloalkyl, each may be unsubstituted or substituted.

When R$^8$ and/or R$^9$ is an alkyl, a lower alkyl having 1 to 4 carbon atoms is preferred. Examples of the group which may be substituted on this alkyl group include alkoxy having 1 to 4 carbon atoms, sulfo, carboxy, hydroxy, chloro, phenyl, cyano and sulfato. It is preferred that the alkyl represented by R$^8$ or R$^9$ is unsubstituted or substituted with one or two substituents selected from the above group. Examples of preferred one include methyl, ethyl, n-propyl, isopropyl, n-butyl, isobutyl, sec-butyl, β-hydroxyethyl, β-sulfatoethyl, β-sulfoethyl, β-methoxyethyl, β-ethoxyethyl, β-chloroethyl and β-carboxyethyl.

In addition, when R$^8$ and/or R$^9$ is an alkyl substituted with a phenyl such as benzyl, the phenyl may be further substituted. Examples of the group which may be substituted on this phenyl include alkyl having 1 to 4 carbon atoms, alkoxy having 1 to 4 carbon atoms, sulfo, chloro and bromo. As the alkyl substituted with the phenyl, an unsubstituted benzyl or a benzyl substituted with one or two substituents selected from the above group is preferred. Examples of the preferred one include benzyl, 2-sulfobenzyl, 3-sulfobenzyl and 4-sulfobenzyl.

When R$^8$ and/or R$^9$ is a phenyl, examples of the group which may be substituted thereon include alkyl having 1 to 4 carbon atoms, alkoxy having 1 to 4 carbon atoms, sulfo, alkyl sulfonic acid having from 1 to 4 carbon atoms, carboxy, chloro and bromo. It is preferred that the phenyl represented by R$^8$ and R$^9$ are unsubstituted or substituted with one or two substituents selected from the above group. Examples of preferred one include phenyl, 2-sulfophenyl, 3-sulfophenyl, 4-sulfophenyl, 2,4-disulfophenyl, 2,5-disulfophenyl, 2-carboxyphenyl, 3-carboxyphenyl, 4-carboxyphenyl, 2-chlorophenyl, 3-chlorophenyl, 4-chlorophenyl, 2-methylphenyl, 3-methylphenyl, 4-methyphenyl, 2-methoxyphenyl, 3-methoxyphenyl, 4-methoxyphenyl, 2-carboxy-4-sulfophenyl, 2-carboxy-5-sulfophenyl, 2-sulfo-4-methylphenyl, 2-sulfo-5-methylphenyl, 2-sulfo-4-methoxyphenyl, 2-sulfo-5-methoxyphenyl, 2-methyl-4-sulfophenyl, 2-methyl-5-sulfophenyl, (3-phenyl) methanesulfonic acid, (4-phenyl)-methanesulfonic acid, 2-methoxy-4-sulfophenyl and 2-methoxy-5-sulfophenyl. Particularly, an unsubstituted phenyl or a phenyl having a sulfo or carboxy is preferred. The phenyl having a sulfo or carboxy may have another substituent.

When $R^8$ and/or $R^9$ is a naphthyl, examples of the group which may be substituted thereon include alkyl having 1 to 4 carbon atoms, alkoxy having 1 to 4 carbon atoms, hydroxy, sulfo, carboxy, chloro and bromo. It is preferred that the naphthyl represented by $R^8$ and/or $R^9$ is unsubstituted or substituted with one, two or three substituents selected from the above group. Among them, those which are unsubstituted or those having sulfo or carboxy are more preferred. Examples of particularly preferred one include 2-sulfo-1-naphthyl, 3-sulfo-1-naphthyl, 4-sulfo-1-naphthyl, 5-sulfo-1-naphthyl, 6-sulfo-1-naphthyl, 7-sulfo-1-naphthyl, 8-sulfo-1-naphthyl, 1-sulfo-2-naphthyl, 5-sulfo-2-naphthyl, 6-sulfo-2-naphthyl, 7-sulfo-2-naphthyl, 8-sulfo-2-naphthyl, 1,5-disulfo-2-naphthyl, 5,7-disulfo-2-naphthyl 6,8-disulfo-2-naphthyl, 4,8-disulfo-2-naphthyl, 4,7-disulfo-2-naphthyl, 3,8-disulfo-2-naphthyl, 4,6-disulfo-2-naphthyl, 3,7-disulfo-2-napthyl, 3,6-disulfo-2-napthyl, 4,6,8-trisulfo-1-naphthyl, 2,4,7-trisulfo-1-naphthyl, 3,6,8-trisulfo-1-naphthyl, 1,5,7-trisulfo-2-naphthyl, 4,6,8-trisulfo-2-naphthyl and 3,6,8-trisulfo-2-naphthyl.

When $R^8$ and/or $R^9$ is a cycloalkyl, it has 5–7 carbon atoms. The group which may be substituted thereon is an alkyl having 1 to 4 carbon atoms.

It is preferred that X is a group represented by the general formula (X1) or (X2). Examples of the preferred X include those represented by the general formula (X1) in which $R^6$ and $R^7$, which are same or different, are hydrogen or an alkyl having 1 to 4 carbon atoms which may be optionally substituted with sulfo, sulfato, carboxy, hydroxy or alkoxy having 1 to 4 carbon atoms; and those represented by the formula (X1) in which $R^6$ is hydrogen, methyl or ethyl and $R^7$ is a phenyl which may be optionally substituted with one or two substituents selected from the group consisting of sulfo, chloro, bromo, carboxy, alkyl having 1 to 4 carbon atoms and alkoxy having 1 to 4 carbon atoms.

In the general formula (I) Z is $—CH=CH_2$ or $—CH_2CH_2Z^1$. Examples of the group represented by $Z^1$, which is removable by the action of an alkali, include sulfate ester, thiosulfate ester, phosphate ester, acetate ester and halogen. As Z, $—CH=CH_2$, $—CH_2CH_2OSO_3H$ or $—CH_2CH_2Cl$ is preferred, and $—CH_2CH_2OSO_3$ is particularly preferred. Above-mentioned $Z^2$ and $Z^3$, which are groups removable by the action of an alkali, are same or different from Z. However, same as $Z^1$, examples of $Z^2$ or $Z^3$ include sulfate ester, thiosulfate ester, phosphate ester, acetate ester and halogen, and preferably they are sulfate ester or chloro, particularly preferably sulfate ester.

Compound I of the present invention exists in the form of a free acid or a salt thereof. Alkaline metal salts and alkaline earth metal salts are preferred, and sodium salt, potassium salt and lithium salt are particularly preferred.

Compound I of the present invention can be produced, for example, by subjecting an aromatic amine represented by the general formula (II):

D—NH$_2$ (II)

wherein D is as defined above;
a naphthol derivative represented by the general formula (III):

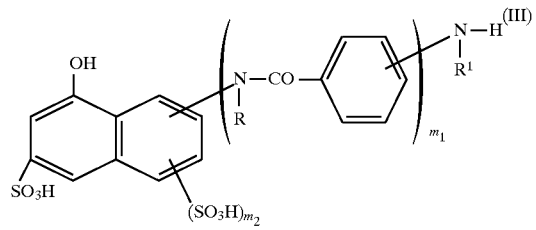

wherein R, $R^1$, $m_1$ and $m_2$ are as defined above;
an aliphatic amine represented by the general formula (IV-1) or (IV-2):

H—Y—SO$_2$Z (IV-1)

H—Y—SO$_2$CH$_2$CH$_2$OH (IV-2)

wherein Y and Z are as defined above;
a compound represented by the general formula (V):

X—H (V)

wherein X is as defined above; and 2,4,6-trihalogeno-s-triazine to a normal coupling reaction and condensation reaction. When using the aliphatic amine represented by the general formula (IV-2), the resulting reaction product is esterified in the following any stage.

In more detail, the aromatic amine represented by the general formula (II) is diazotized to obtain a diazonium salt, and reactions among the diazonium salt thus obtained, 1-naphthol derivative of formula (III) and the aliphatic amine of formula(IV-1) or (IV-2), the compound of formula (V) and 2,4,6-trihalogeno-s-triazine are carried out in any order so that the diazonium salt is coupled at the 2-position of the 1-naphthol derivative of formula(III) and that —NHR$^1$ of the naphthol derivative of formula(III), the aliphatic amine of formula(IV-1) or (IV-2) and the compound of formula(V) are condensed with a halogen atom of 2,4,6-trihalogeno-s-triazine, respectively. When using the aliphatic amine of formula (IV-2), the compound I can be obtained by esterifying the reaction product in the following any stage. Examples of the substituents on Y in the formula (IV-2) include 2-hydroxyethyl sulfonyl in addition to the above-mentioned examples of the substituents on Y. By esterification, the 2-hydroxyethyl sulfonyl can be converted to —SO$_2$CH$_2$CH$_2$Z$^2$ or —SO$_2$CH$_2$CH$_2$Z$^3$ wherein $Z^2$ and $Z^3$ are a group removable by the action of an alkali.

As the examples of the method, following two methods can be mentioned.

The first method comprises condensing the aliphatic amine of formula (IV-1), the compound of formula (V) and a monoazo intermediate represented by the general formula (VI):

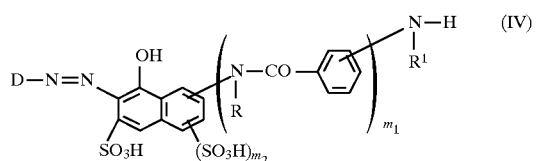

wherein D, R, $R^1$, $m_1$ and $M_2$ are as defined above with 2,4,6-trihalogeno-s-triazine in any order. The monoazo intermediate of formula (VI) is synthesized by a known method. For example, it can be produced by diazotizing the aromatic amine of formula (II) and coupling the resulting reaction product with the naphthol derivative of formula (III).

In the condensation reaction with 2,4,6-trihalogeno-s-triazine, the order is not specifically limited and the reaction conditions are not also specifically limited. However, usually, condensation reaction with unsubstituted 2,4,6-trihalogeno-s-triazine is carried out at a temperature of −10° to +40° C. and at pH 2 to 9, condensation reaction with monosubstituted 2,4,6-trihalogeno-s-triazine is carried out at a temperature of 0° to 70° C. and at pH 2 to 9, and condensation reaction with disubstituted 2,4,6-trihalogeno-s-triazine is carried out at a temperature of 10° to 100° C. and at pH 2 to 7.

The second method comprises carrying out a diazo coupling of the diazonium salt, obtained by diazotizing the aromatic amine of formula (II), in the middle or last stage of the whole steps. That is, the naphthol derivative of formula (III) is condensed firstly, secondly or thirdly with 2,4,6-trihalogeno-s-triazine, and then the aliphatic amine of formula (IV-1) and compound of formula (V) are condensed, respectively, in the stage which is different from that of the condensation of the naphthol derivative of formula(III). Compound I can be obtained by coupling the diazonium salt obtained by diazotizing the aromatic amine of formula(II), after the completion of the first, second or third condensation when the naphthol derivative of formula(III) was condensed first, after the completion of the second or third condensation when the naphthol derivative of formula (III) was condensed secondly, or after the completion of the third condensation when the naphthol derivative of formula (III) was condensed thirdly.

The compound of the present invention can be produced as described above, but is not limited to the method as described above. As the raw material, 2,4,6-trihalogeno-s-triazinie, cyanuric chloride and cyanuric fluoride are preferred.

Examples of the aromatic amine represented by the general formula(II) include 2-aminobenzenesulfonic acid, 3-aminobenzenesulfonic acid, 4-aminobenzenesulfonic acid, 4-aminobenzene-1,3-disulfonic acid, 2-aminobenzene-1, 4-disulfonic acid, 4-amino-3-carboxybenzenesulfonic acid, 3-amino-4-carboxybenzenesulfonic acid, 2-amino-5-methoxybenzenesulfonic acid, 2-amino-5-methylbenzenesulfonic acid, 4-amino-3-methoxybenzenesulfonic acid, 3-amino-4-methoxybenzenesulfonic acid, 4-amino-3-methylbenzenesulfonic acid, 3-amino-4-methylbenzenesulfonic acid, 2-amino-5-chloro-4-methylbenzenesulfonic acid, 4-amino-2-chloro-5-methylbenzenesulfonic acid, 4-amino-3-chloro-5-methylbenzenesulfonic acid, 2-aminonaphthalene-1-sulfonic acid, 2-aminonaphthalene-1,5-disulfonic acid, 2-aminonaphthalene-4,8-disulfonic acid, 2-aminonaphthalene-3,6-disulfonic acid, 2-aminonaphthalene-5,7-disulfonic acid, 2-aminonaphthalene-6,8-disulfonic acid, 2-aminonaphthalene-3,6,8-trisulfonic acid and 2-aminonaphthalene-4,6,8-trisulfonic acid. Among them, 2-aminobenzenesulfonic acid, 3-aminobenzenesulfonic acid, 4-aminobenzenesulfonic acid, 4-aminobenzene-1,3-disulfonic acid, 2-aminobenzene-1, 4-disulfonic acid, 2-amino-5-methoxybenzenesulfonic acid, 2-aminonaphthalene-1-sulfonic acid, 2-aminonaphthalene-1, 5-disulfonic acid, 2-aminonaphthalene-4,8-disulfonic acid, 2-aminonaphthalene-3,6,8-trisulfonic and 2-aminonaphthalene-4,6,8-trisulfonic acid are preferred.

Examples of the naphthol derivative of formula (III) include 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 1-amino-8-hydroxynaphthalene-6-sulfonic acid, 1-(31-aminobenzoylamino)-8-hydroxynaphthalene-3,6- or -4,6-disulfonic acid, and compounds of which amino group is N-methylated or N-ethylated.

Examples of the aliphatic amine of formula(IV-1) include the followings:

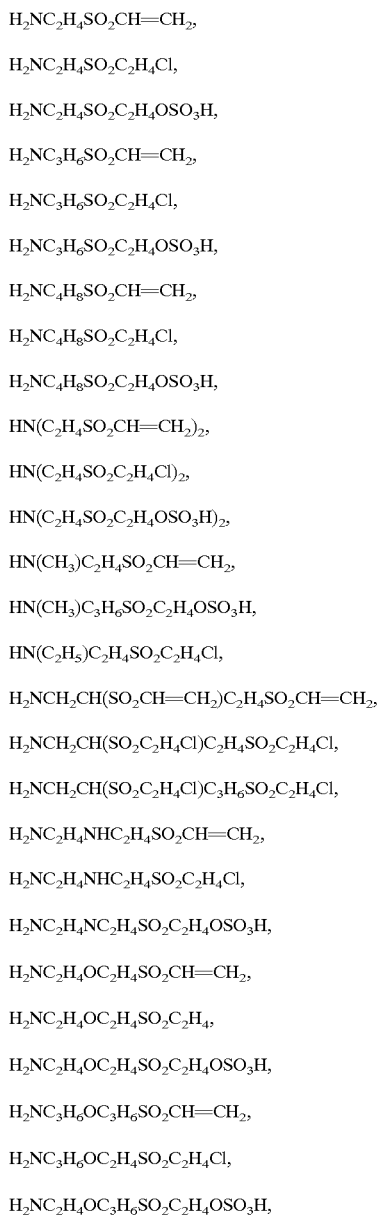

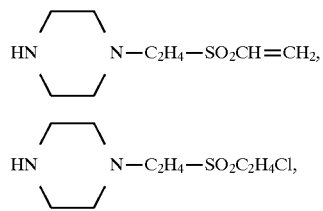

-continued

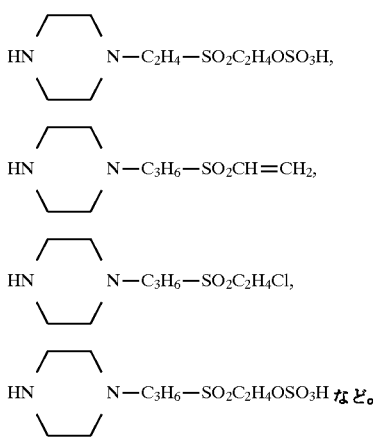

Examples of the aliphatic amine of formula (IV-$_2$) include compounds in which —CH═CH2, —C$_2$H$_4$Cl or —C$_2$H$_4$OSO$_3$H in the above-described examples of the aliphatic amine of formula (IV-1) is changed to —C$_2$H$_4$OH.

Examples of the compound represented by the general formula (V) include the followings:

ammonia; anilines such as aminobenzene, 1-amino-2-menthylbenzene,1-amino-3-methylbenzene, 1-amino-4-methylbenzene, 1-amino-3,4-dimethylbenzene, 1-amino-3,5-dimethylbenzene,1-amino-2-ethylbenzene, 1-amino-3-ethylbenzene, 1-amino-4-ethylbenzene, 1-amino-2-methoxybenzene, 1-amino-3-methoxybenzene, 1-amino-4-methoxybenzene, 1-amino-2-ethoxybenzene, 1-amino-3-ethoxybenzene, 1-amino-4-ethoxybenzene, 1-amino-2-chlorobenzene, 1-amino-3-chlorobenzene, 1-amino -4-chlorobenzene, 2-aminophenol, 3-aminophenol, 4-aminophenol, 1-amino-3-acetylaminobenzene, 1-amino-4-acetylaminobenzene, 2-aminobenzenesulfonic acid, 3-aminobenzenesulfonic acid, 4-aminobenzenesulfonic acid, 3- or 4-methylaminobenzenesulfonic acid, 3-ethylaminobenzenesulfonic acid, 4-ethylaminobenzenesulfonic acid, 4-aminobenzene-1,3-disulfonic acid, 5-aminobenzene-1,3-disulfonic acid, 2-aminobenzene-1,4-disulfonic acid, 4-aminobenzene-1,2-disulfonic acid, 4-amino-5-methylbenzene-1,2-disulfonic acid, 2-aminobenzoic acid, 3-aminobenzoic acid, 4-aminobenzoic acid, 5-aminobenzene-1,3-dicarboxylic acid, 4-amino-2-hydroxybenzenesulfonic acid, 5-amino-2-hydroxybenzenesulfonic acid, 5-amino-2-ethoxybenzenesulfonic acid, N-methylaminobenzene, N-ethylaminobenzene, 1-methylamino-3-chlorobenzene, 1-methylamino-4-chlorobenzene, 1-methylamino-3-methylbenzene, 1-methylamino-4-methylbenzene, 1-ethylamino-4-chlorobenzene, 1-ethylamino-3- or -4-methylbenzene, 1-(2-hydroxyethyl)amino-3-methylbenzene, 3-methylaminobenzoic acid, 4-methylaminobenzoic acid, 3-methylaminobenzenesulfonic acid, 4-methylaminobenzenesulfonic acid, 4-amino-3-carboxybenzenesulfonic acid, 3-amino-4-carboxybenzenesulfonic acid, 2-amino-4-methylbenzenesulfonic acid, 2-amino-5-methylbenzenesulfonic acid, 2-amino-4-methoxybenzenesulfonic acid, 2-amino-5-methoxybenzenesulfonic acid, 3-amino-4-methoxybenzenesulfonic acid, 4-amino-3-methoxybenzenesulfonic acid, 3-amino-4-methylbenzenesulfonic acid, 4-amino-3-methylbenzenesulfonic acid, 3-aminophenylmethanesulfonic acid and 4-aminophenylmethanesulfonic acid;

naphthylamines such as 2-aminonaphthalene-1-sulfonic acid, 4-aminonaphthalene-1-sulfonic acid, 5-aminonaphthalene-1-sulfonic acid, 6-aminonaphthalene-1-sulfonic acid, 7-aminonaphthalene-1-sulfonic acid, 8-aminonaphthalene-1-sulfonic acid, 1-aminonaphthalene-2-sulfonic acid, 4-aminonaphthalene-2-sulfonic acid, 5-aminonaphthalene-2-sulfonic acid, 6-aminonaphthalene-2-sulfonic acid, 7-aminonaphthalene-2-sulfonic acid, 8-aminonaphthalene-2-sulfonic acid, 7-methylaminonaphthalene-2-sulfonic acid, 7-ethylaminonaphthalene-2-sulfonic acid, 4-aminonaphthalene-1,3-disulfonic acid, 5-aminonaphthalene-1,3-disulfonic acid, 6-aminonaphthalene-1,3-disulfonic acid, 7-aminonaphthalene-1,3-disulfonic acid, 8-aminonaphthalene-1,3-disulfonic acid, 2-aminonaphthalene-1,5-disulfonic acid, 3-aminonaphthalene-1,5-disulfonic acid, 4-aminonaphthalene-1,5-disulfonic acid, 3-aminonaphthalene-1,6-disulfonic acid, 4-aminonaphthalene-1,6-disulfonic acid, 7-aminonaphthalene-1,6-disulfonic acid, 8-aminonaphthalene-1,6-disulfonic acid, 3-aminonaphthalene-1,7-disulfonic acid, 3-aminonaphthalene- 2,6-disulfonic acid, 3-aminonaphthalene-2,7-disulfonic acid, 4-aminonaphthalene-1,7-disulfonic acid, 4-aminonaphthalene 2,6-disulfonic acid, 4-aminonaphthalene-2,7-disulfonic acid, 6-aminonaphthalene-1,3,5-trisulfonic acid, 7-aminonaphthalene-1,3,5-trisulfonic acid, 8-aminonaphthalene-1,3,5-trisulfonic acid, 4-aminonaphthalene-1,3,6-trisulfonic acid, 7-aminonaphthalene-1,3,6-trisulfonic acid, 8-aminonaphthalene-1,3,6-trisulfonic acid and 4-aminonaphthalene-1,3,7-trisulfonic acid;

aliphatic amines such as methylamine, ethylamine, n-propylamine, isopropylamine, n-butylamine, isobutylamine, sec-butylamine, dimethylamine, diethylamine, methylethylamine, 2-chloroethylamine, 2-methoxyethylamine, 2-aminoethanol, 2-methylaminoethanol, bis(2-hydroxyethyl)amine, 2-acetylamincethylamine, 1-amino-2-propanol, 3-methoxypropylamine, 1-amino-3-dimethylaminopropane, 2-aminoethanesulfonic acid, aminomethanesulfonic acid, 2-methylaminoethanesulfonic acid, 3-amino-1-propanesulfonic acid, 2-sulfato ethylamine, N-methyl-2-sulfato ethylamine, bis(2-sulfato ethylamine, 2-carbamoylethylamine, 2-sulfamoylethylamine, aminoacetic acid, methylaminoacetic acid, ε-aminocaproic acid, cyclohexylamine, cyclopentylamine, benzylamine, 2-, 3- or 4-chlorobenzylamine, 4-methylbenzylamine, N-methylbenzylamirie, 2-, 3- or 4-sulfobenzylamine, 2-phenylethylamine, 1-phenylethylamine and 1-phenyl-2-propylamine;

cyclic amines such as morpholine, piperidine, pyrrolidine,

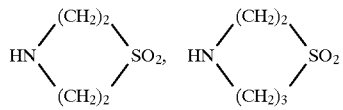

phenols such as phenol, 1-hydroxy-2-methylbenzene, 1-hydroxy-3-methylbenzene, 1-hydroxy-4-methylbenzene, 1-hydroxy-3,5-dimethylbenzene, 1-hydroxy-3,4-dimethylbenzene, 1-hydroxy-2-ethylbenzene, 1-hydroxy-3-ethylbenzene, 1-hydroxy-4-ethylbenzene, 1-hydroxy-2-methoxybenzene, 1-hydroxy-3-methoxybenzene, 1-hydroxy-4-methoxybenzene, 1-hydroxy-2-ethoxybenzene, 1-hydroxy-3-ethoxybenzene, 1-hydroxy-4-ethoxybenzene, 1-hydroxy-2-chlorobenzene, 1-hydroxy-3-chlorobenzene, 1-hydroxy-4-chlorobenzene, 3-hydroxyphenylmethanesulfonic acid, 4-hydroxyphenylmethanesulfonic acid, 3-hydroxybenzenesulfonic acid, 4-hydroxybenzenesulfonic acid, 5-hydroxybenzene-1,3-disulfonic acid, 2-hydroxybenzene-1,4-disulfonic acid, 4-hydroxybenzene-1,2-disulfonic acid, 4-hydroxy-5-methylbenzene-1,2-disulfonic acid, 3-hydroxybenzoic acid, 4-hydroxybenzoic acid, 5-hydroxybenzene-1,3-dicarboxylic acid and 5-hydroxy-2-ethoxybenzenesulfonic acid;

naphthols such as 2-, 4-, 5-, 6-, 7- or 8-hydroxynaphthalene-1-sulfonic acid, 1-, 4-, 5-, 6-, 7- or 8-hydroxynaphthalene-2-sulfonic acid, 4-, 5-, 6-, 7- or 8-hydroxynaphthalene-1,3-disulfonic acid, 2-, 3- or 4-hydroxynaphthalene-1,5-disulfonic acid, 4- or 8-hydroxynaphthalene-1,6-disulfonic acid, 4-hydroxynaphthalene-1,7-disulfonic acid, 3- or 4-hydroxynaphthalene-2,6-disulfonic acid, 3- or 4-hydroxynaphthalene-2,7-disulfonic acid, 6- or 7-hydroxynaphthalene-1,3,5-trisulfonic acid and 4-hydroxynaphthalene-1,3,6-trisulfonic acid;

aliphatic alcohols such as methanol, ethanol, n-propanol, isopropanol, n-butanol, isobutanol, sec-butanol, 2-chloroethanol, 2-methyoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfato ethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenyl ethanol and 1-phenyl-2-propanol; and compounds in which a hydroxyl group in the above phenols, naphthols or aliphatic alcohols is changed to mercapto.

Compound I of the present invention has a fiber reactivity, and it can be used for dyeing or printing a hydroxyl group-containing material or a carbonamide group-containing material. It is preferred that the material is used in the form of a fiber material or a mixed material thereof. The hydroxyl group-containing material can be natural or synthetic hydroxyl group-containing materials, such as cellulose fiber material, a regenerated product thereof and polyvinyl alcohol. As the cellulose fiber material, cotton or other vegetable fiber such as linen, flax, jute and ramie fiber is preferred. Examples of the regenerated cellulose fiber include viscose staple and filament viscose. Examples of the carbonamide group-containing material include synthetic or natural polyamide, polyurethane and leather. Particularly, there can be used those in the form of a fiber, such as wool, other animal fiber, silk, polyamide-6,6, polyamide-6, polyamide-11 and polyamide-4.

The compound of the present invention can be dyed or printed on the above-described materials, particularly above-described fiber materials, by the method according to their physical and chemical properties.

For example, when the cellulose fiber material is dyed, the dyeing is carried out at a comparatively low temperature in the presence of sodium carbonate, tribasic sodium phosphate, sodium hydroxide, etc. by optionally adding neutral salts such as mirabilite or sodium chloride and by using dissolving auxiliaries, penetrating agents or leveling agents in combination, if desired. The neutral salt which accelerates adsorption of a dye can be added after or before the temperature reached a substantial dyeing temperature, and it can also be added in several portions. When the cellulose fiber material is dyed according to a padding method, the padding is carried out at room temperature or elevated temperature and, after drying, the dye can be fixed by steaming or dry heating.

When the cellulose fiber material is printed, the printing can be carried out in one phase, for example, by using a printing paste containing sodium bicarbonate and other acid binding agent, followed by steaming at 95° to 160° C. or it can be carried out in two phases, for example, by using a neutral or weak acid printing paste, followed by passing through a hot electrolyte-containing alkaline bath or over-padding in an alkaline electrolyte-containing padding solution and further steaming or dry heating treatment. Sizing agents or emulsifiers such as sodium arginate and starch ether are used as the printing paste, and normal printing auxiliaries and/or dispersants such as urea may be optionally used in combination.

The acid binding agent suitable for fixing the compound of the present invention on the cellulose fiber material can be, for example, hydroxides of alkaline metals, water-soluble basic salts of alkaline or alkaline earth metals and inorganic or organic acids, or compounds which liberates an alkaline in a state of heating. Hydroxides of alkaline metals and alkaline metal salts of weak or middle inorganic or organic acids are preferred. Among them, hydroxides of sodium or potassium, sodium salt and potassium salt are particularly preferred. Examples of the acid binding agent include sodium hydroxide, potassium hydroxide, sodium bicarbonate, sodium carbonate, sodium formate, potassium carbonate, monobasic-, dibasic- or tribasic sodium phosphate, sodium silicate and sodium trichloroacetate.

The dyeing of a synthetic or natural polyamide or polyurethane fiber material can be carried out by firstly adsorbing from an acid or weak acid dye bath while controlling the pH value, and changing the pH value to a neutral or alkaline pH value so as to fix the dye. The dyeing can be normally carried out at a temperature of 60° to 120° C. In order to accomplish the leveling, there can be used a normal leveling agent such as condensation product of cyanuric chloride and 3-fold mol parts aminobenzenesulfonic acid or aminonaphthalenesulfonic acid, or addition product of stearylamine and ethylene oxide.

The compound of the present invention imparts a red or rouge color tone on the fiber material, but it can be optionally used in combination with other dye so as to obtain the other desired color tone. In this case, the dye to be mixed is not specifically limited, and any reactive dye can be used. Examples of preferred one include dyes having one or more reactive groups, at least one of the reactive group being sulfato ethylsulfonyl group, vinylsulfonyl group, monochlorotriazinyl group, monofluorotriazinyl group, mononicotinic acid triazinyl group, dichlorotriazinyl group, difluoromonochloropyrimidinyl group or trichloropyrimidinyl group; dyes which are commercially available under the trade name of Sumifix, Sumifix Supra, Remazol, Levafix, Procion, Cibacron, Basilen, Drimarene, Kayacion, Kakacelon React, etc; and dyes described in Japanese Patent Kokai Nos. 50-178, 56-9483 (EP-A-22,265), 56-15481 (EP-A-21,105), 56-118976 (EP-A-35,171), 56-128380, 57-2365 (EP-A-42,108), 57-89679 (EP-A-52,985), 57-143360 (EP-A-56,975), 58-191755, 59-15451 (EP-A-99,721), 59-96174, 59-161463, 60-6754, 60-123559, 60-229957 (GB-A-2,160,883), 60-260654, 61-155469 (EP-A-184,071), 63-77974 (EP-A-239,847), 63-225665 (EP-A-264,878), 1-185370 (EP-A-325,246), 3-770 (EP-A-385,120), etc.

The compound of the present invention is characterized by an excellent performance in dyeing and printing of fiber materials. Particularly, the compound is suitable for dyeing cellulose fiber materials, and the dyed article obtained from this compound has good light fastnesss and perspiration sunlight fastness as well as excellent humidity fastness such as washing fastness, peroxidation washing fastness, perspiration fastness, acid hydrolysis fastness and alkaline fastness. Furthermore, it has good chlorine fastness, rub fastness and ironing fastness.

In addition, this compound is characterized by excellent build-up properties, leveling and wash-off properties as well as good solubility and adsorbing/fixing properties. This compound is also characterized in that the resulting dyed product have stable qualities because a change in dyeing temperature, amount of the neutral salt or acid binding agent or dye bath ratio gives little influence thereon. Furthermore, it is also characterized in that the resulting dyed product is hardly discolored at the time of fixing treatment or resin processing and is hardly changed due to the contact with a basic substance at the time of preservation.

In addition, the compound of the present invention shows excellent build-up properties and alkaline stability in cold batch-up dyeing and, at the same time, there can be hardly observed a difference in concentration and color tone between fixing at low temperature and that at room temperature. It also have a performance that it is not easily hydrolyzed by an alkaline agent.

The following examples further illustrate the present invention in detail but are not construed to limit the invention. In the examples, all "parts" and "%" are by weight unless otherwise stated.

EXAMPLE 1

25.3 Parts of 2-aminobenzene-1,4-disuilfonic acid was condensed with 18.5 parts of cyanuric chloride in an aqueous medium under an acidic condition according to a normal method to obtain a condensate. Then, 50.3 parts of a monoazo intermediate synthesized by a normal method, the free acid form of which being represented by the formula (1):

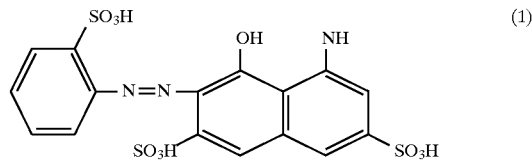

was condensed with the above condensate to obtain a compound the free acid form of which being represented by the following formula:

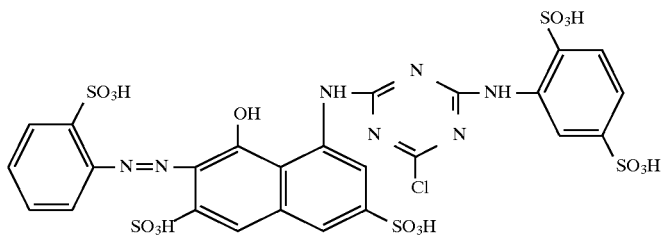

This compound was condensed with 24.7 parts of 3-(2'-sulfato ethylsulfonyl)propylamine in an aqueous medium at pH 3 to 6 at a temperature of 60° to 80° C. to obtain a monoazo compound, the free acid form of which being represented by the formula (2):

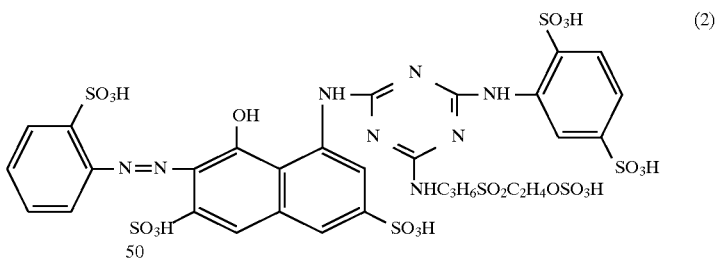

Measured in an aqueous solution, λ max of this compound was 544 nm and this compound imparted a red color tone on a cotton.

EXAMPLE 2

50.3 Parts of the monoazo intermediate of formula (1), synthesized according to a normal method, was condensed with 18.5 parts of cyanuric chloride in an aqueous medium according to a normal method. Then, 24.7 parts of 3, (2'-sulfato ethylsulfonyl)propylamine was added and, after condensing under the weak acidic condition, the resultant was condensed with 25.3 parts of 2-aminobenzene-1,4-disulfonic acid to obtain a monoazo compound of formula (2).

EXAMPLE 3

50.3 Parts of the monoazo intermediate of formula (1), synthesized according to a normal method, was condensed with 18.5 parts of cyanuric chloride in an aqueous medium according to a normal method. Then, 25.3 parts of 2-aminobenzene-1,4-disulfonic acid was added and, after condensing under the weak acidic condition, the resultant was condensed with 24.7 parts of 3-(2'-sulfato ethylsulfonyl) propylamine to obtain a monoazo compound of formula (2).

EXAMPLE 4

31.9 Parts of 1-amino-8-hydroxynaphthalene-3,6-disulfonic acid was condensed with 18.5 parts of cyanuric chloride in an aqueous medium at pH 2 to 5, at a temperature of 0° to 15° C. Then, 16.7 parts of 3-(2'-hydroxyethylsulfonyl)propylamine was added and, after condensing at a temperature of 15° to 40° at pH 6 to 9, the resultant was coupled with 25.3 parts of a diazotized product of 2-aminobenzenesulfonic acid at a temperature of 0° to 15° C. at pH 1 to 4 according to a normal method. The resulting compound was condensed with 25.3 parts of 2-aminobenzene-1,4-disulfonic acid at a temperature of 50° to 80° C. at pH 2 to 5, followed by esterification with sulfuric acid to obtain a monoazo compound of formula (2).

EXAMPLE 5

According to the same operation as that described in Example 4 except for using 24.7 parts of 3-(2'-sulfato ethylsulfonyl)propylamine in place of 16.7 parts of 3-(2'-hydroxyethylsulfonyl)propylamine used in Example 4 and eliminating the last esterification, the same results as those of Example 4 were obtained.

EXAMPLE 6

According to the same operation as that described in Example 1, Example 2, Example 3 or Example 5 except for using the compound shown in the column A of the following Tables, compound shown in the column B of the following Tables and compound shown in the column C of the following Tables in place of the monoazo intermediate, 2-aminobenzene-1,4-disulfonic acid and 3-(2'-sulfato ethylsulfonyl)propylamine, respectively, used in Example 1, Example 2, Example 3 and Example 5, corresponding monoazo compounds are obtained. These compounds respectively impart the color tone described in the column D of the following Tables on a cotton.

In the Tables in this specification, """ "means same as above".

| No. | A | B | C | D |
|---|---|---|---|---|
| 1 | 8-amino-7-(2-sulfophenylazo)-1-hydroxynaphthalene-3,6-disulfonic acid | 2-amino-1,4-benzenedisulfonic acid (H₂N at position 2, SO₃H at 1 and 4) | H₂NC₂H₄SO₂C₂H₄OSO₃H | Red |
| 2 | 8-amino-7-(2-sulfophenylazo)-1-hydroxynaphthalene-3,5-disulfonic acid | " | H₂NC₃H₆SO₂C₂H₄Cl | " |
| 3 | " | 3-aminobenzenesulfonic acid (H₂N meta to SO₃H) | H₂NC₂H₄SO₂C₂H₄Cl | " |
| 4 | 7-amino-4-hydroxy-3-(2-sulfophenylazo)naphthalene-2-sulfonic acid | " | H₂NC₃H₆SO₂CH=CH₂ | " |
| 5 | 6-amino-4-hydroxy-3-(2-sulfophenylazo)naphthalene-2-sulfonic acid | " | H₂NC₂H₄SO₂CH=CH₂ | Scarlet |
| 6 | 7-amino-1-hydroxy-2-(2-sulfophenylazo)naphthalene-3-sulfonic acid | 2-amino-1,4-benzenedisulfonic acid | H₂NC₃H₆SO₂CH=CH₂ | Red |

-continued

| No. | A | B | C | D |
|---|---|---|---|---|
| 7 | naphthalene with SO₃H, OH, NH₂, SO₃H substituents and azo linkage to phenyl-SO₃H | " | H₂NC₂H₄OC₂H₄SO₂C₂H₄Cl | |
| 8 | " | " | HN(C₂H₄SO₂C₂H₄OSO₃H)₂ | |
| 9 | naphthalene with NHCO-(m-aminophenyl), OH, SO₃H, azo-naphthalene-SO₃H and SO₃H | " | H₂NC₃H₆SO₂C₂H₄OSO₃H | |
| 10 | " | aminobenzene-1,3-disulfonic acid (H₂N, SO₃H, SO₃H) | H₂NC₂H₄SO₂C₂H₄OSO₃H | |
| 11 | naphthalene with NHCO-(m-aminophenyl), OH, SO₃H, azo-phenyl-SO₃H and SO₃H | aminobenzene with SO₃H groups | H₂NC₃H₆SO₂CH=CH₂ | Red |
| 12 | " | aminobenzene with SO₃H groups | H₂NC₂H₄SO₂CH=CH₂ | |
| 13 | " | " | CH₃–CH(HNC₂H₄SO₂C₂H₄OSO₃H) | |
| 14 | " | " | piperazine with NC₂H₄SO₂C₂H₄OSO₃H | |

-continued

| No. | A | B | C | D |
|---|---|---|---|---|
| 15 | naphthalene with SO₃H, N=N, OH, NH₂, SO₃H substituents | aniline with H₂N, SO₃H, SO₃H | " | |
| 16 | naphthalene with SO₃H, N=N, OH, NH₂, SO₃H substituents | aniline with H₂N, SO₃H, SO₃H | HNC₂H₄SO₂C₂H₄OSO₃H with CH₃ | Red |
| 17 | " | morpholine (HN with O) | H₂NC₃H₆SO₂C₂H₄OSO₃H | |
| 18 | " | " | H₂NC₂H₄SO₂C₂H₄OSO₃H | |
| 19 | naphthalene with SO₃H, N=N, OH, NH₂ substituents | " | " | Scarlet |
| 20 | " | C₂H₅-HN-phenyl | H₂NC₃H₆SO₂CH=CH₂ | |
| 21 | naphthalene with SO₃H, N=N, OH, NH₂, SO₃H, SO₃H substituents | CH₃-HN-phenyl | H₂NC₃H₆SO₂C₂H₄OSO₃H | Red |
| 22 | " | | H₂NC₂H₄SO₂C₂H₄OSO₃H | |

-continued

| No. | A | B | C | D |
|---|---|---|---|---|
| 23 | 6-amino-1-hydroxy-3-sulfo-2-[(4-methoxy-2-sulfophenyl)azo]naphthalene | morpholine (HN-morpholine) | H₂NC₃H₆SO₂CH=CH₂ | Scarlet |
| 24 | " | " | H₂NC₂H₄SO₂C₂H₄OSO₃H | Red |
| 25 | 4-amino-5-hydroxy-1,7-disulfo-6-[(4-methoxy-2-sulfophenyl)azo]naphthalene | morpholine (HN-morpholine) | H₂NC₂H₄SO₂CH=CH₂ | Red |
| 26 | 4-amino-5-hydroxy-2,7-disulfo-6-[(4-methoxy-2-sulfophenyl)azo]naphthalene | C₆H₅NH(C₂H₅) | H₂NC₂H₄SO₂C₂H₄OSO₃H | Scarlet |
| 27 | 6-amino-4-hydroxy-2-sulfo-3-[(1,5-disulfonaphth-2-yl)azo]naphthalene | 4-Cl-C₆H₄-NH(C₂H₅) | H₂NC₂H₄SO₂C₂H₄Cl | Scarlet |
| 28 | " | 3-Cl-C₆H₄-NH₂ | H₂NC₂H₄SO₂C₂H₄Cl | — |
| 29 | 4-amino-5-hydroxy-2,7-disulfo-6-[(1,5-disulfonaphth-2-yl)azo]naphthalene | | H₂NC₃H₆SO₂C₂H₄OSO₃H | Red |

-continued

| No. | A | B | C | D |
|---|---|---|---|---|
| 30 | " | 4-Cl-C6H4-NH2 | H2NC2H4SO2C2H4OSO3H | Red |
| 31 | [naphthalene structure with NHCO-(3-NH2-C6H4), OH, N=N, SO3H groups] | 4-Cl-C6H4-NH2 | H2NC3H6SO2C2H4OSO3H | |
| 32 | " | 3-Cl-C6H4-NH(CH3) | H2NC2H4SO2C2H4OSO3H | |
| 33 | " | 4-CH3-C6H4-NH2 | " | |
| 34 | " | 3-SO3H-C6H4-NH2 | " | |
| 35 | " | 2-COOH-C6H4-NH2 | " | |
| 36 | [naphthalene structure with NH2, OH, N=N, SO3H groups] | 4-SO3H-C6H4-NH2 | H2NC2H4SO2C2H4OSO3H | Red |

-continued

| No. | A | B | C | D |
|-----|---|---|---|---|
| 37 | " | 4-H₂N-C₆H₄-OCH₃ | " | |
| 38 | " | 6-amino-2-naphthalenesulfonic acid (H₂N-naphthalene-SO₃H) | " | |
| 39 | " | piperidine (HN in 6-membered ring) | " | |
| 40 | " | H₂NC₂H₄OCH₃ | " | |
| 41 | " | H₂NCH₂-C₆H₅ (benzylamine) | H₂NC₃H₆SO₂C₂H₄OSO₃H | Red |
| 42 | " | H₂NC₄H₈SO₂NH₂ | " | |
| 43 | " | 2-H₂N-C₆H₄-CH₃ (o-toluidine) | H₂NC₂H₄SO₂C₂H₄OSO₃H | |
| 44 | " | 4-H₂N-C₆H₄-OH | H₂NC₃H₆-OC₂H₄SO₂C₂H₄OSO₃H | |
| 45 | " | 4-Cl-C₆H₄-NH(C₂H₅) | H₂NC₃H₆SO₂C₂H₄OSO₃H | |

-continued

| No. | A | B | C | D |
|---|---|---|---|---|
| 46 | 4-amino-5-hydroxy-2-(2-sulfophenylazo)naphthalene-7-sulfonic acid | 6-amino-naphthalene-1,5-disulfonic acid (H₂N-naphthalene with SO₃H groups) | H₂NC₂H₄SO₂C₂H₄Cl | Red |
| 47 | " | 3-acetamidoaniline (H₂N-C₆H₄-NHCOCH₃) | H₂NC₂H₄SO₂C₂H₄OSO₃H | |
| 48 | " | 2,4-dimethylaniline | H₂NC₃H₆SO₂C₂H₄OSO₃H | |
| 49 | " | morpholine | " | |
| 50 | " | pyrrolidine | " | |
| 51 | 4-amino-5-hydroxy-2-(2-sulfophenylazo)naphthalene-8-sulfonic acid | CH₃—HNC₂H₄OSO₃H | H₂NC₂H₄SO₂C₂H₄OSO₃H | Red |
| 52 | 8-amino-1-hydroxy-2-(1-sulfonaphthalen-2-ylazo)naphthalene-3,6-disulfonic acid | NH₃ | " | |

-continued

| No. | A | B | C | D |
|---|---|---|---|---|
| 53 | " | $H_2NCH_3$ | " | |
| 54 | " | $H_2NC_2H_4SO_3H$ | " | |
| 55 | " | " | $H_2NC_3H_6SO_2C_2H_4Cl$ | |
| 56 | (naphthalene-azo-naphthalene structure with $NH_2$, OH, $SO_3H$ groups) | $H_2NC_2H_4OH$ | $H_2NC_3H_6SO_2C_2H_4OSO_3H$ | Red |
| 57 | (naphthalene-azo-naphthalene structure with $NH_2$, OH, $SO_3H$ groups) | $H_2NC_2H_4CONH_2$ | $H_2NC_2H_4SO_2CH=CH_2$ | |
| 58 | " | $CH_3$—$HNC_2H_4SO_3H$ | $H_2NC_2H_4OC_2H_4SO_2C_2H_4Cl$ | |
| 59 | (naphthalene-azo-naphthalene structure with $NH_2$, OH, $SO_3H$ groups) | $HN(CH_3)_2$ | (morpholine)N—$C_2H_4SO_2C_2H_4OSO_3H$ | |
| 60 | (naphthalene-azo-naphthalene structure with $NH_2$, OH, $SO_3H$ groups) | $H_2NC_2H_4OH$ | $H_2NC_2H_4SO_2C_2H_4OSO_3H$ | Scarlet |
| 61 | (naphthalene-azo-naphthalene structure with $NH_2$, OH, $SO_3H$ groups) | 2-chloroaniline ($H_2N$-C$_6$H$_4$-Cl) | $H_2NC_3H_6SO_2C_2H_4OSO_3H$ | Scarlet |
| 62 | " | $H_2NC_2H_4Cl$ | $H_2NC_2H_4SO_2CH=CH_2$ | |

-continued

| No. | A | B | C | D |
|---|---|---|---|---|
| 63 | [naphthalene with OH, SO₃H, NH₂, N=N-phenyl-SO₃H] | cyclohexyl-NH₂ | H₂NC₂H₄SO₂C₂H₄OSO₃H | |
| 64 | " | H₂NC₂H₅ | H₂NC₃H₆SO₂C₂H₄OSO₃H | |
| 65 | " | H₂NC₂H₄SO₃H | " | Red |
| 66 | [naphthalene with NH₂, OH, SO₃H, SO₃H, N=N-phenyl-SO₃H] | phenol | H₂NC₂H₄SO₂C₂H₄OSO₃H | |
| 67 | " | " | H₂NC₃H₆SO₂C₂H₄OSO₃H | |
| 68 | [naphthalene with NH₂, OH, SO₃H, SO₃H, N=N-phenyl-SO₃H] | 2-chlorophenol | H₂NC₂H₄SO₂C₂H₄OSO₃H | |
| 69 | " | thiophenol | H₂NC₃H₆SO₂C₂H₄OSO₃H | |

-continued

| No. | A | B | C | D |
|---|---|---|---|---|
| 70 | ![structure with naphthalene, OH, NH2, SO3H, N=N-phenyl-SO3H] | " | H₂NC₃H₆SO₂CH=CH₂ | Scarlet |
| 71 | ![similar structure] | HOCH₃ | H₂NC₂H₄SO₂CH=CH₂ | Red |
| 72 | ![naphthalene with NH2, OH, SO3H, N=N-phenyl-SO3H] | " | H₂NC₂H₄OC₂H₄—SO₂C₂H₄OSO₃H | |
| 73 | " | HOC₂H₅ | HN(C₂H₄SO₂C₂H₄OSO₃H)₂ | |
| 74 | ![structure with NHCO-aminophenyl, naphthalene-OH, SO3H, N=N-naphthalene-SO3H] | " | H₂NC₃H₆SO₂C₂H₄OSO₃H | |
| 75 | " | ![thiomorpholine dioxide HN-SO₂] | H₂NC₂H₄SO₂C₂H₄OSO₃H | |
| 76 | ![structure with NHCO-aminophenyl, naphthalene-OH, SO3H, N=N-phenyl-SO3H] | ![4-chlorophenol HO-C₆H₄-Cl] | H₂NC₃H₆SO₂CH=CH₂ | Red |

| No. | A | B | C | D |
|---|---|---|---|---|
| 77 | [naphthalene with SO₃H, N=N, SO₃H, OH, NH₂, SO₃H] | 3-methoxyphenol (HO-C₆H₄-OCH₃) | $H_2NC_2H_4SO_2CH=CH_2$ | |
| 78 | " | " | $CH_3\text{—}HNC_2H_4SO_2C_2H_4OSO_3H$ | |
| 79 | " | " | morpholine-N-$C_2H_4SO_2C_2H_4OSO_3H$ | |
| 80 | " | 4-methoxyphenol | " | |
| 81 | [naphthalene with SO₃H, N=N, SO₃H, OH, NH₂, SO₃H] | 2-chlorophenol | $CH_3\text{—}HNC_2H_4SO_2C_2H_4OSO_3H$ | |
| 82 | " | $HOCH(CH_3)_2$ | $H_2NC_3H_6SO_2C_2H_4OSO_3H$ | |
| 83 | " | phenol | $H_2NC_2H_4SO_2C_2H_4OSO_3H$ | Red |
| 84 | [naphthalene with SO₃H, N=N, SO₃H, OH, NH₂ and SO₃H] | " | " | |
| 85 | " | $HOCH_3$ | $H_2NC_3H_6SO_2CH=CH_2$ | Scarlet |

| No. | A | B |
|---|---|---|
| 1 | 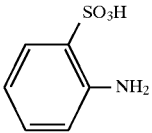 | 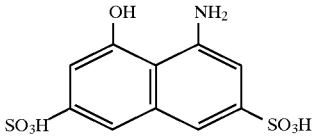 |
| 2 | " | 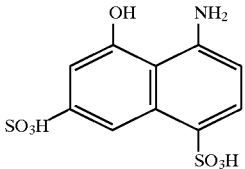 |
| 3 | " | " |
| 4 | " | 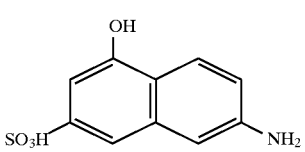 |
| 5 | " | 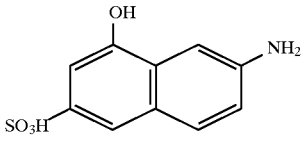 |
| 6 | 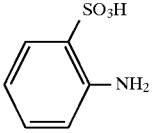 | 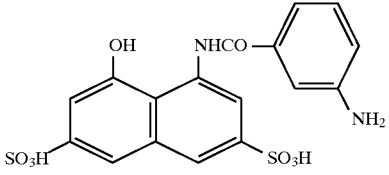 |
| 7 | 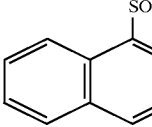 | 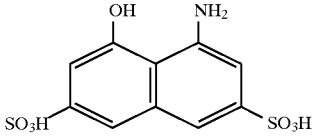 |
| 8 | " | 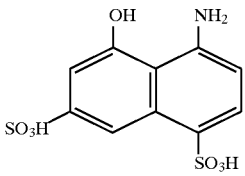 |
| 9 | " | 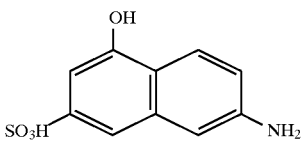 |
| 10 | 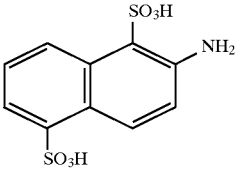 | 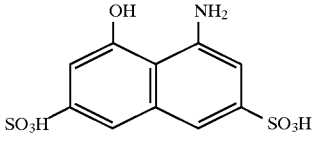 |

-continued

| | | |
|---|---|---|
| 11 | 2-amino-naphthalene-1,5-disulfonic acid | 8-amino-1-hydroxynaphthalene-3,6-disulfonic acid |
| 12 | 2-amino-4-methoxybenzenesulfonic acid | " |
| 13 | " | 6-amino-1-hydroxynaphthalene-3-sulfonic acid |
| 14 | 2-amino-naphthalene-1,5-disulfonic acid | " |
| 15 | " | " |
| 16 | 2-amino-naphthalene-1,5-disulfonic acid | 8-amino-1-hydroxynaphthalene-3,6-disulfonic acid |
| 17 | " | 4-(3-aminobenzoylamino)-5-hydroxynaphthalene-2,7-disulfonic acid |
| 18 | " | " |
| 19 | " | " |
| 20 | " | 8-amino-1-hydroxynaphthalene-3,6-disulfonic acid |
| 21 | 2-amino-naphthalene-1,5-disulfonic acid | 8-amino-1-hydroxynaphthalene-3,6-disulfonic acid |
| 22 | " | " |

-continued

| | | |
|---|---|---|
| 23 | " | 8-amino-1-hydroxy-naphthalene-3,5-disulfonic acid (OH, NH₂ at peri positions; SO₃H at 3 and 5) |
| 24 | " | " |
| 25 | 2-aminobenzenesulfonic acid (SO₃H ortho to NH₂) | 8-amino-1-hydroxy-naphthalene-3,6-disulfonic acid |
| 26 | 2-aminobenzenesulfonic acid | 8-amino-1-hydroxy-naphthalene-3,6-disulfonic acid |
| 27 | " | " |
| 28 | " | " |
| 29 | " | 8-amino-1-hydroxy-naphthalene-3,5-disulfonic acid |
| 30 | " | " |
| 31 | 2-aminobenzenesulfonic acid | 8-amino-1-hydroxy-naphthalene-3,5-disulfonic acid |
| 32 | " | " |
| 33 | 2-aminonaphthalene-1-sulfonic acid | 8-amino-1-hydroxy-naphthalene-3,6-disulfonic acid |
| 34 | " | " |
| 35 | " | " |
| 36 | 2-aminonaphthalene-1-sulfonic acid | 8-amino-1-hydroxy-naphthalene-3,6-disulfonic acid |
| 37 | " | " |
| 38 | 2-aminonaphthalene-1,5-disulfonic acid | 6-amino-1-hydroxy-naphthalene-3-sulfonic acid |
| 39 | " | " |

-continued
| | | |
|---|---|---|
| 40 | 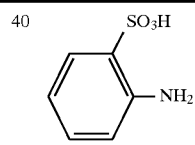 | " |
| 41 | 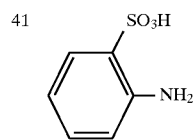 | 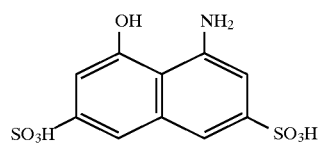 |
| 42 | " | 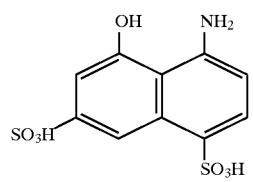 |
| 43 | " | " |
| 44 | " | 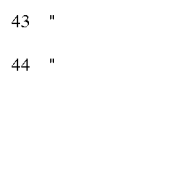 |
| 45 | " | 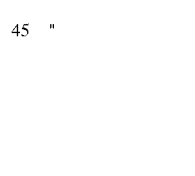 |
| 46 | 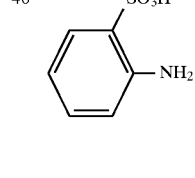 | 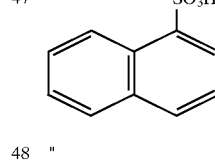 |
| 47 | 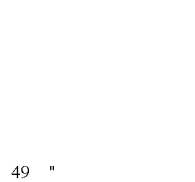 | 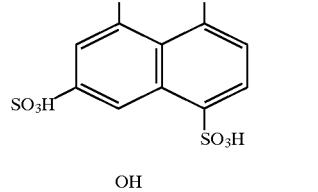 |
| 48 | " | 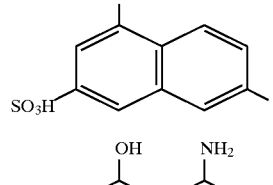 |
| 49 | " | 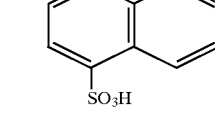 |
| 50 | 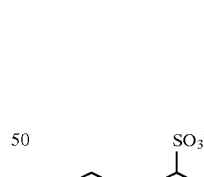 | 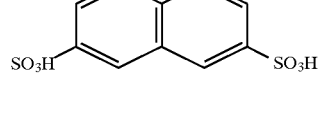 |

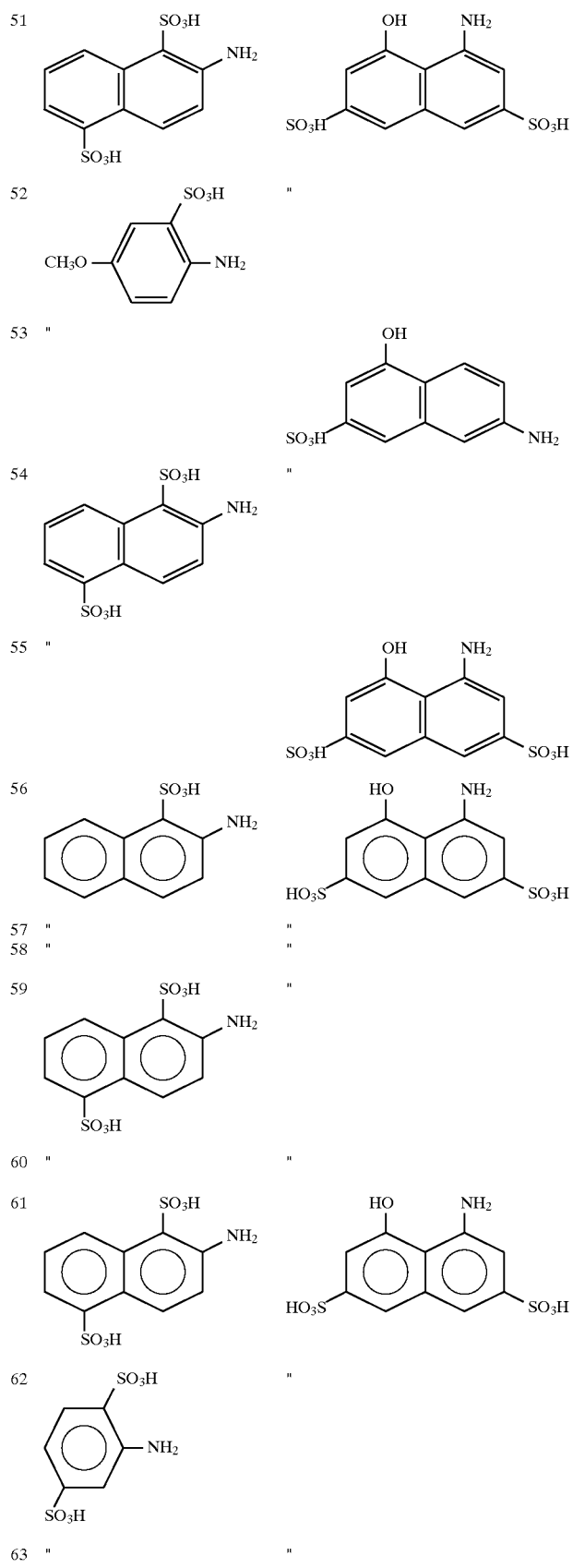

-continued
| | | |
|---|---|---|
| 64 | " | " |
| 65 | " | " |
| 66 | 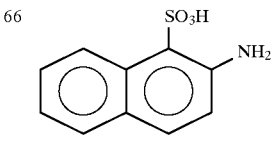 | 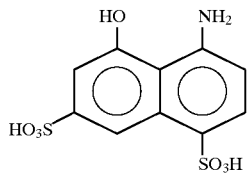 |
| 67 | " | " |
| 68 | " | " |
| 69 | " | " |
| 70 | " | " |
| 71 | 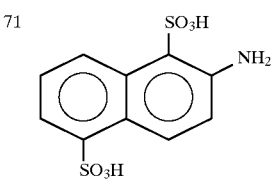 | 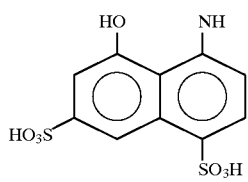 |
| 72 | 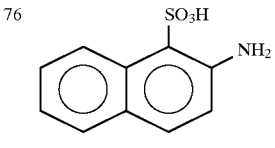 | " |
| 73 | 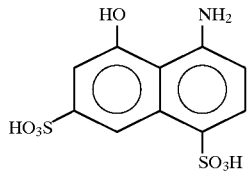 | " |
| 74 | " | " |
| 75 | " | " |
| 76 | 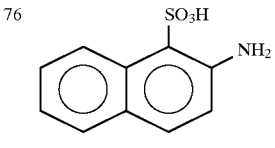 | 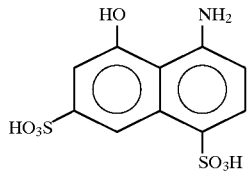 |
| 77 | " | " |
| 78 | " | " |
| 79 | " | " |
| 80 | 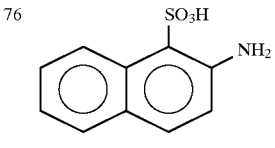 | " |
| No. | C | D | E |
|---|---|---|---|
| 1 | 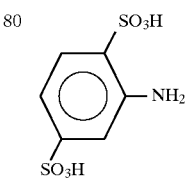 | $H_2NC_3H_6SO_2C_2H_4OH$ | Red |
| 2 | " | " | " |

-continued

| | | | |
|---|---|---|---|
| 3 | ![benzene with SO3H, H2N, SO3H] | H₂NC₂H₄SO₂C₂H₄OH | " |
| 4 | " | " | Scarlet |
| 5 | " | " | Red |
| 6 | ![benzene with SO3H, H2N, SO3H] | H₂NC₂H₄SO₂C₂H₄OH | Red |
| 7 | ![benzene with SO3H, H2N, SO3H] | " | " |
| 8 | ![morpholine] | " | " |
| 9 | " | H₂NC₃H₆SO₂C₂H₄OH | Scarlet |
| 10 | ![N-ethylaniline] | H₂NC₂H₄SO₂C₂H₄OH | Red |
| 11 | ![N-methylaniline] | H₂NC₃H₆SO₂C₂H₄OH | Red |
| 12 | ![morpholine] | H₂NC₂H₄SO₂C₂H₄OH | " |
| 13 | " | H₂NC₃H₆SO₂C₂H₄OH | Scarlet |
| 14 | ![N-ethylaniline] | H₂NC₂H₄SO₂C₂H₄OH | " |
| 15 | ![4-chloro-N-ethylaniline] | H₂NC₃H₆SO₂C₂H₄OH | " |
| 16 | ![3-chloroaniline] | H₂NC₂H₄SO₂C₂H₄OH | Red |
| 17 | ![4-chloroaniline] | " | " |

| No. | | | |
|---|---|---|---|
| 18 | 3-chloro-N-methylaniline (CH₃-NH-C₆H₄-Cl) | $H_2NC_3H_6SO_2C_2H_4OH$ | " |
| 19 | 3-aminobenzenesulfonic acid ($H_2N$-C₆H₄-$SO_3H$) | " | " |
| 20 | anthranilic acid ($H_2N$-C₆H₄-COOH) | " | " |
| 21 | 6-amino-2-naphthalenesulfonic acid | $H_2NC_3H_6SO_2C_2H_4OH$ | Red |
| 22 | $H_2NC_2H_4OCH_3$ | " | " |
| 23 | $H_2NC_2H_4SO_2NH_2$ | $H_2NC_2H_4SO_2C_2H_4OH$ | " |
| 24 | benzylamine ($H_2NCH_2$-C₆H₅) | " | " |
| 25 | 4-aminophenol ($H_2N$-C₆H₄-OH) | " | " |
| 26 | 4-chloro-N-ethylaniline (C₂H₅-NH-C₆H₄-Cl) | $H_2NC_2H_4SO_2C_2H_4OH$ | Red |
| 27 | 2-aminonaphthalene-1,5-disulfonic acid | $H_2NC_3H_6SO_2C_2H_4OH$ | " |
| 28 | 4-acetamidoaniline ($H_2N$-C₆H₄-NHCOCH₃) | " | " |
| 29 | pyrrolidine (HN⟨cyclic⟩) | $H_2NC_2H_4SO_2C_2H_4OH$ | " |
| 30 | HN(CH₃)(C₂H₅) | $H_2NC_3H_6SO_2C_2H_4OH$ | " |
| 31 | $NH_3$ | $H_2NC_3H_6SO_2C_2H_4OH$ | Red |
| 32 | $H_2NC_2H_5$ | " | " |
| 33 | $H_2NC_2H_4SO_3H$ | " | " |
| 34 | $H_2NC_2H_4OH$ | $H_2NC_2H_4SO_2C_2H_4OH$ | " |
| 35 | $H_2NC_2H_4CONH_2$ | $H_2NC_3H_6SO_2C_2H_4OH$ | " |
| 36 | $H_2NC_2H_4SO_3H$ | $H_2NC_2H_4SO_2C_2H_4OH$ | Red |
| 37 | $HN(CH_3)_2$ | " | " |

-continued

| No. | | | |
|---|---|---|---|
| 38 | 2-chloroaniline (Cl, H₂N on benzene) | " | Scarlet |
| 39 | cyclohexylamine (H₂N on cyclohexane) | $H_2NC_3H_6SO_2C_2H_4OH$ | " |
| 40 | $H_2NCH_3$ | $H_2NC_2H_4SO_2C_2H_4OH$ | Red |
| 41 | phenol (HO on benzene) | $H_2NC_3H_6SO_2C_2H_4OH$ | Red |
| 42 | " | " | " |
| 43 | 2-chlorophenol (Cl, HO on benzene) | $H_2NC_2H_4SO_2C_2H_4OH$ | " |
| 44 | " | " | Scarlet |
| 45 | $HOCH_3$ | " | Red |
| 46 | 3-methoxyphenol (HO, OCH₃ on benzene) | $H_2NC_2H_4SO_2C_2H_4OH$ | Red |
| 47 | 4-chlorophenol (HO, Cl on benzene) | " | " |
| 48 | $HOC_2H_5$ | " | " |
| 49 | " | $H_2NC_3H_6SO_2C_2H_4OH$ | Scarlet |
| 50 | thiophenol (HS on benzene) | $H_2NC_2H_4SO_2C_2H_4OH$ | Red |
| 51 | phenol (HO on benzene) | $H_2NC_3H_6SO_2C_2H_4OH$ | Red |
| 52 | $HOCH_3$ | $H_2NC_2H_4SO_2C_2H_4OH$ | " |
| 53 | " | $H_2NC_3H_6SO_2C_2H_4OH$ | Scarlet |
| 54 | $HOCH(CH_3)_2$ | $H_2NC_2H_4SO_2C_2H_4OH$ | " |
| 55 | 4-methylphenol (HO, CH₃ on benzene) | $H_2NC_3H_6SO_2C_2H_4OH$ | Red |
| 56 | aniline (H₂N on benzene) | $H_2NC_3H_6SO_2C_2H_4OH$ | Red |
| 57 | 2-aminobenzoic acid (H₂N, CO₂H on benzene) | $H_2NC_2H_4SO_2C_2H_4OH$ | " |

-continued

| | | | |
|---|---|---|---|
| 58 | H₂N—⟨benzene⟩ | " | " |
| 59 | H₂N—⟨benzene⟩—CH₃ (with CH₃ at ortho) | H₂NC₃H₆SO₂C₂H₄OH | " |
| 60 | H₂N—⟨benzene⟩ | H₂NC₂H₄SO₂C₂H₄OH | " |
| 61 | H₂N—⟨benzene⟩—Cl | H₂NC₂H₄OC₂H₄SO₂C₂H₄OH | Red |
| 62 | H₂N—⟨benzene⟩ | H₂NC₂H₄SO₂C₂H₄OH | " |
| 63 | H₂N—⟨benzene⟩—OH | H₂NC₃H₆SO₂C₂H₄OH | " |
| 64 | H₂N—⟨benzene⟩—SO₃H | " | " |
| 65 | H₂N—⟨benzene⟩—CO₂H | H₂NC₂H₄SO₂C₂H₄OH | " |
| 66 | H₂N—⟨benzene⟩ | H₂NC₂H₄SO₂C₂H₄OH | Red |
| 67 | H₂N—⟨benzene⟩—CO₂H | " | " |
| 68 | H₂N—⟨benzene⟩—SO₃H | " | " |
| 69 | H₂N—⟨benzene⟩—OH | " | " |
| 70 | H₂N—⟨benzene⟩—CH₃ | " | " |

| | | | |
|---|---|---|---|
| 71 | 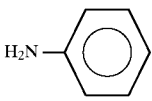 | H$_2$NC$_3$H$_6$SO$_2$C$_2$H$_4$OH | Red |
| 72 | 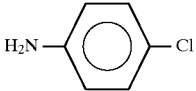 | " | " |
| 73 | 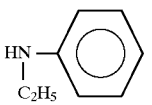 | " | " |
| 74 |  | H$_2$NC$_2$H$_4$SO$_2$C$_2$H$_4$OH | " |
| 75 | 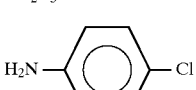 | " | " |
| 76 | 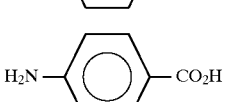 | H$_2$NC$_2$H$_4$SO$_2$C$_2$H$_4$OH | Red |
| 77 | 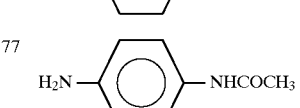 | " | " |
| 78 |  | " | " |
| 79 | 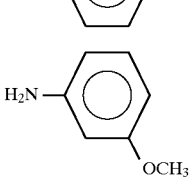 | " | " |
| 80 | 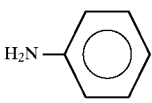 | " | " |

Dyeing Example 1

Each of the monoazo compounds (0.3 part) obtained in Example 1, 6 or 7 is dissolved into 200 parts of water. 20 parts of sodium sulfate and, then, 10 parts of cotton are added thereto and the temperature is elevated to 60° C. After 20 minutes since the temperature reaches to 60° C., 4 parts of sodium carbonate is added and dyeing is carried out at that temperature for one hour. After completion of the dyeing, the dyed cotton is washed with water and soaping is conducted. A bright red or scarlet-colored dyed product deeply-dyed and excellent in various fastness, particularly chlorine fastness, sunlight fastness and perspiration sunlight fastness, and build-up property can be obtained.

Dyeing Example 2

Each of the monoazo compounds (0.3 part) obtained in Example 1, 6 or 7 is dissolved into 300 parts of water. 30 parts of sodium sulfate and, then, 10 parts of cotton are added thereto and the temperature is elevated to 50° C. After 20 minutes since the temperature reaches to 50° C., 5 parts of sodium carbonate is added and dyeing is carried out at that temperature for one hour. After completion of the dyeing, the dyed cotton is washed with water and soaping is conducted. A bright red or scarlet-colored dyed product deeply-dyed and excellent in various fastness, particularly chlorine fastness, sunlight fastness and perspiration sunlight fastness, and build-up property can be obtained.

Dyeing Example 3

Using each of the monoazo compounds obtained in Example 1, 6 or 7, a color paste having the following composition was prepared.

| | |
|---|---|
| MONOAZO compound | 5 parts |
| Urea | 5 parts |
| Sodium alginate (5%) stock paste | 50 parts |
| Hot water | 25 parts |

| | |
|---|---|
| Sodium bicarbonate | 2 parts |
| Balance | 13 parts |

A mercerized cotton broad cloth was printed with each color paste. After intermediate drying, steaming was conducted at 100° C. for 5 minutes. Then, the cotton cloth was washed with hot water, soaped, washed with hot water and dried. A bright red or scarlet-colored printed product having a high fixation ratio and excellent in various fastness, particularly chlorine fastness, sunlight fastness and perspiration sunlight fastness, and in build-up property can be obtained.

Dyeing Example 4

25 Parts of each of the monoazo compounds obtained in Example 1, 6 or 7 is dissolved into hot water and the resulting solution is cooled down to 25° C. Then, 5.5 parts of 32.5% of aqueous hydroxide solution and 150 parts of 50. Be sodium silicate are added, and then water is further added at 25° C. so that the amount of total solution become 1000 parts. Immediately after the preparation of the solution, using the solution as the padding liquor, a cotton fabric is padded. Then, the cotton fabric is batched up, enveloped all over in a polyethylene film to be away from ambient atomosphere and then left at a temperature of 20° C. for 20 hours. Another cotton fabric is treated according to the same manner except that it is left at a temperature of 5° C. for 20 hours. Thereafter, the cotton fabric is washed with cold water, washed with hot water, soaped in a boiling detergent solution, washed with cold water and dried, successively. Substantially no difference in color and color depth can be observed between the dyed product left at 5° C. and the one left at 20° C. According to the cold-batch-up dyeing, dyed products having good build-up property can be obtained.

Dyeing Example 5

25 Parts of each of the monoazo compounds obtained in Example 1, 6 or 7 is dissolved into hot water and the resulting solution is cooled down to 25° C. Then, 10 parts of 32.5% of aqueous hydroxide solution and 30 parts of anhydrous sodium sulfate are added, and then water is further added at 25° C. so that the amount of total solution become 1000 parts. Immediately after the preparation of the solution, using the solution as the padding liquor, a viscose rayon fabric is padded. Then, the viscose rayon fabric is batched up, enveloped all over in a polyethylene film to be away from ambient atomosphere and then left at a temperature of 20° C. for 20 hours. Another viscose rayon fabric is treated according to the same manner except that it is left at a temperature of 5° C. for 20 hours. Thereafter, the viscose rayon fabric is washed with cold water, washed with hot water, soaped in a boiling detergent solution, washed with cold water and dried, successively. Substantially no difference in color and color depth can be observed between the dyed product left at 5° C. and the one left at 20° C. According to the cold-batch-up dyeing, dyed products having good build-up property can be obtained.

Dyeing Example 6

Using each of the monoazo compound used in Dyeing example 1, Dyeing example 1 is repeated except that the amount of sodium carbonate is changed from 4 parts to 3 parts. A dyed product having qualities same as those obtained in Dyeing example 1 can be obtained.

Dyeing Example 7

Using each of the monoazo compound used in Dyeing example 1, Dyeing example 1 is repeated except that the temperature is changed from 60° C. to 50° C. A dyed product having qualities same as those obtained in Dyeing example 1 can be obtained.

Dyeing Example 8

Using each of the monoazo compound used in Dyeing example 1, Dyeing example 1 is repeated except that the temperature is changed from 60° C. to 70° C. A dyed product having qualities same as those obtained in Dyeing example 1 can be obtained.

Dyeing Example 9

Using each of the monoazo compound used in Dyeing example 1, Dyeing example 1 is repeated except that the amount of sodium sulfate is changed from 20 parts to 15 parts. A dyed product having qualities same as those obtained in Dyeing example 1 can be obtained.

We claim:

1. A monoazo compound represented by the general formula (I):

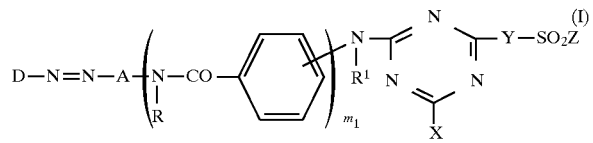

wherein

D is a phenyl or naphthyl group which is unsubstituted or substituted with alkyl having 1 to 4 carbon atoms, alkoxy having 1 to 4 carbon atoms, carboxy, sulfo, halogeno or nitro;

R and $R^1$, which are same or different, are hydrogen or an optionally substituted lower alkyl;

$m_1$ is 0 or 1;

A is a naphthylene represented by the general formula (A1):

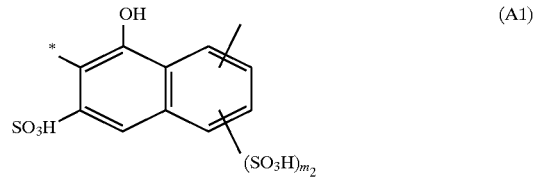

in which $m_2$ is 0 or 1, and * indicate the position bonding to azo group;

Y is an aliphatic connecting group represented by the general formula (Y1), (Y2) or (Y3):

in which $R^2$ is hydrogen and $R^3$ is hydrogen or an optionally substituted lower alkyl, $W^1$ is an optionally substituted alkylene having 1 to 5 carbon atoms, $W^2$ and $W^3$, which are same or different, are an alkylene having 2 to 6 carbon atoms, Q is —O— or —$NR^4$— in which $R^4$ is hydrogen or an alkyl having 1 to 4 carbon atoms, p is from 1 to 6, and ** indicates the position bonding to —$SO_2Z$;

Z is —CH=$CH_2$ or —$CH_2CH_2Z^1$ in which $Z^1$ is a group removable by the action of an alkali;

X is a group represented by the general formula (X1), (X2), (X3) or (X4):

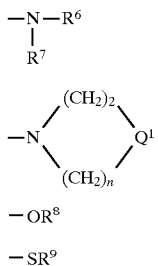

$$-OR^8 \quad (X3)$$
$$-SR^9 \quad (X4)$$

wherein $R^6$ is hydrogen or an optionally substituted alkyl; $R^7$ and $R^9$, which are same or different, are hydrogen, an optionally substituted alkyl, an optionally substituted phenyl, an optionally substituted naphthyl or an optionally substituted cycloalkyl having 5 to 7 carbon atoms, provided that $R^6$ and $R^7$ have no fiber reactive group, $R^8$ is an optionally substituted alkyl, an optionally substituted phenyl, and optionally substituted naphthyl or an optionally substituted cycloalkyl having 5 to 7 carbon atoms, n is from 1 to 3, Q1 is —O—, —S—, —$CH_2$—, —$SO_2$— or —$NR^{10}$— in which $R^{10}$ is hydrogen or an alkyl having 1 to 4 carbon atoms;

provided that when $m_1$, is 0; D—N=N—A—$NR^1$— is 5-hydroxy-7-sulfo-6-(1',5'-disulfo-2'-naphthylazo)-2-naphthylamino or 5-hydroxy-7-sulfo-6-(4'-methoxy-2',5'-disulfophenylazo)-2-naphthylamino;

Y—$SO_2Z$ is 2-(2'-chloroethylsulfonyl) ethylamino and X is represented by the general formula (X1) wherein $R^7$ is an unsubstituted phenyl, then $R^6$ is an optionally substituted lower alkyl; and when either $m_1$ is 0, D—N=N—A—$NR^1$— is 5-hydroxy-7-sulfo-6-(2'-sulfophenylazo)-2-naphthylamino, Y—$SO_2Z$ is 2-(2'-chlorethylsulfonyl) ethylamino and X is represented by the general formula (X2) wherein n is 2, or $m_1$ is 1, D—N=N—A—NR— is 8-hydroxy-3,6-disulfo-7-(1', 5'-disulfo-2'naphthylazo)-1-naphthylamino, —$NR^1$—locates at the para-position to —CO—, Y—$SO_2Z$ is 2-(2'-chloroethylsulfonyl) ethylamino or and X is represented by the general formula (X2) wherein n is 2, then $Q^1$ is not 0;

or a salt thereof.

2. A compound according to claim 1, wherein D is substituted by at least one sulfo group.

3. A compound according to claim 1, wherein R and $R^1$ each represent hydrogen.

4. A compound according to claim 1, wherein Y is represented by the formula:

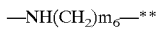

wherein $m_6$ is 2 or 3; and ** is as defined in claim 1.

5. A compound according to claim 1, wherein X is represented by the general formula (X1) or (X2).

6. A compound according to claim 5, wherein X is represented by the general formula (X1) in which $R^6$ and $R^7$, which are same or different, are hydrogen or an alkyl having 1 to 4 carbon atoms which may be optionally substituted with sulfo, sulfate, carboxy, hydroxy or alkoxy having 1 to 4 carbon atoms.

7. A compound according to claim 5, wherein X is represented by the general formula (X1) in which $R^6$ is hydrogen, methyl or ethyl; and $R^7$ is a phenyl which may be optionally substituted with one or two substituents selected from the group consisting of sulfo, chloro, bromo, carboxy, alkyl having 1 to 4 carbon atoms and alkoxy having 1 to 4 carbon atoms.

8. A compound according to claim 1, wherein $m_1$ is 0.

9. A compound according to claim 1, wherein Z is —CH=$CH_2$, —$CH_2CH_2OSO_3H$ or —$CH_2CH_2Cl$.

10. A compound according to claim 9, wherein Z is —$CH_2CH_2OSO_3H$.

11. A dyeing or printing method of a fiber material, which comprises applying the compound according to claim 1, to the fiber material.

* * * * *